(12) United States Patent
Kubota et al.

(10) Patent No.: US 9,401,095 B2
(45) Date of Patent: Jul. 26, 2016

(54) INFORMATION PROCESSING SYSTEM, INFORMATION PROCESSING METHOD, AND PROGRAM

(71) Applicant: Sony Corporation, Tokyo (JP)

(72) Inventors: Ichiro Kubota, Kanagawa (JP); Hiromitsu Aikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 14/239,738

(22) PCT Filed: Oct. 5, 2012

(86) PCT No.: PCT/JP2012/075919
§ 371 (c)(1),
(2) Date: Feb. 19, 2014

(87) PCT Pub. No.: WO2013/054748
PCT Pub. Date: Apr. 18, 2013

(65) Prior Publication Data
US 2014/0168348 A1 Jun. 19, 2014

(30) Foreign Application Priority Data
Oct. 13, 2011 (JP) ................................ 2011-226288

(51) Int. Cl.
*H04N 7/14* (2006.01)
*G09B 5/06* (2006.01)
*G06Q 30/06* (2012.01)
G06Q 50/20 (2012.01)

(52) U.S. Cl.
CPC *G09B 5/06* (2013.01); *G06Q 30/06* (2013.01); *H04N 7/148* (2013.01); G06Q 50/20 (2013.01)

(58) Field of Classification Search
CPC ....................................................... H04N 7/14
USPC ..................... 348/14.01, 14.03, 14.07, 14.08; 715/753
See application file for complete search history.

(56) References Cited

U.S. PATENT DOCUMENTS 5,736,982 A * 4/1998 Suzuki et al. ................. 715/706
7,086,005 B1 * 8/2006 Matsuda ....................... 715/706
(Continued)

FOREIGN PATENT DOCUMENTS

JP  9-70030 A  3/1997
JP  2001-243179 A  9/2001
(Continued)

OTHER PUBLICATIONS

International Search Report issued Oct. 30, 2012, in PCT/JP2012/075919.

*Primary Examiner* — Olisa Anwah
(74) *Attorney, Agent, or Firm* — Chip Law Group

(57) ABSTRACT

Provided is an information processing system including a position management unit configured to manage positions of avatars operated by users in a virtual space, a schedule management unit configured to manage a schedule of communication of the users, and a control unit configured to cause communication between terminals used by the users who are scheduled to have the communication to be established when the avatars of the users who are scheduled to have the communication gather in a predefined place in the virtual space and to cause at least one of an image and a voice to be transmitted and received.

14 Claims, 24 Drawing Sheets

(56) References Cited

U.S. PATENT DOCUMENTS

| | | | |
|---|---|---|---|
| 2008/0014569 A1* | 1/2008 | Holiday | G09B 3/00 434/351 |
| 2008/0020361 A1* | 1/2008 | Kron et al. | 434/262 |
| 2008/0114844 A1 | 5/2008 | Sanchez et al. | |
| 2009/0210822 A1* | 8/2009 | Schindler | G06Q 10/109 715/810 |
| 2009/0254843 A1* | 10/2009 | Van Wie | H04L 12/1822 715/757 |
| 2010/0161456 A1* | 6/2010 | Boss | G06Q 10/10 705/30 |
| 2011/0169927 A1* | 7/2011 | Mages | G06F 3/04815 348/51 |
| 2011/0274104 A1* | 11/2011 | Cozzi | H04W 4/021 370/352 |
| 2011/0288884 A1* | 11/2011 | Algoo | G06Q 50/01 705/3 |

FOREIGN PATENT DOCUMENTS

| | | |
|---|---|---|
| JP | 2003-233296 A | 8/2003 |
| JP | 2010-509697 A | 3/2010 |

* cited by examiner

| POSITION INFORMATION (X, Y) IN HIGHEST SPACE | UPPER SPACE ID | POSITION INFORMATION (X, Y) IN UPPER SPACE | LOWER SPACE ID | POSITION INFORMATION (X, Y) IN LOWER SPACE |
|---|---|---|---|---|

B

| POSITION INFORMATION (X, Y) IN HIGHEST SPACE | UPPER SPACE ID | POSITION INFORMATION (X, Y) IN UPPER SPACE | LOWER SPACE ID | POSITION INFORMATION (X, Y) IN LOWER SPACE |
|---|---|---|---|---|
| X10, Y10 | ID 104 | X1, Y1 | ID 200 | X2, Y2 |

FIG.14

USER INFORMATION
• USER ID
• AVATAR
• RESIDENCE
• SCHEDULE
  LESSON: TIME, VENUE, PARTICIPANTS (STUDENT AND TEACHER)
• MESSAGE TRANSMISSION DESTINATION
• CALL INFORMATION

INFORMATION PROCESSING SYSTEM, INFORMATION PROCESSING METHOD, AND PROGRAM

TECHNICAL FIELD

The present technology relates to an information processing system, an information processing method, and a program, and particularly to an information processing system, an information processing method, and a program that enable an easy start of real-time communication that uses images and voices.

BACKGROUND ART

As methods of real-time communication performed via a network, there are not only chatting using text messages but also VoIP (Voice over Internet Protocol) and video phones using images and voices. For example, a conference with a number of people, or an English conversation lesson between a teacher and a student is commonly held using the function of video phones.

Patent Literature 1 discloses a technology relating to a screen display when a lesson or a conference is held in a virtual space. In addition, Patent Literature 2 discloses a technology of providing an asynchronous lesson in which each student can receive a lesson in an asynchronous manner based on teaching material data and a synchronous lesson in which students can receive a lesson while exchanging information with each other in a virtual space.

CITATION LIST

Patent Literature

Patent Literature 1: JP H9-70030A
Patent Literature 2: JP 2003-233296A
Patent Literature 3: JP 2001-243179A

SUMMARY OF INVENTION

Technical Problem

In order to start a conference or a lesson in a virtual space, it is necessary for each participant to be designated with a telephone number of an IP address and to make a call to his or her counterpart. An identification number such as a telephone number or an IP address is allocated to the terminal that each participant uses. When the counterpart of the call destination makes a response to the call, the terminal of the call source is connected to the terminal of the call destination, real-time two-way communication using images (moving images) and voices is possible accordingly, and thereby the conference or the lesson is started.

When a student receives a lesson in the physical world, however, he or she does not have to worry about an identification number such as the telephone number of a teacher. The student goes to a designated classroom before the lesson starts, a teacher enters the classroom, and the lesson begins.

It is desired for a lesson in a virtual space to likewise start without a student having to worry about an identification number such as the telephone number of a teacher. For example, it is desired for the teacher to enter the classroom in which the student is already waiting by the start time of the lesson and then for the lesson to begins immediately.

It is desirable to enable an easy start of real-time communication that uses images and voices.

Solution to Problem

According to an embodiment of the present disclosure, there is provided an information processing system including a position management unit configured to manage positions of avatars operated by users in a virtual space, a schedule management unit configured to manage a schedule of communication of the users, and a control unit configured to cause communication between terminals used by the users who are scheduled to have the communication to be established when the avatars of the users who are scheduled to have the communication gather in a predefined place in the virtual space and to cause at least one of an image and a voice to be transmitted and received.

According to an embodiment of the present disclosure, the users who are scheduled to have the communication may be a teacher who provides a lesson using images and voices and a student who receives the lesson.

According to an embodiment of the present disclosure, the users who are scheduled to have the communication may be participants in a conference using images and voices.

According to an embodiment of the present disclosure, in a case where the predefined place is a place allocated as a residence of the avatar of the predetermined user who is scheduled to have the communication, the control unit may cause the communication between the terminals to be established when the avatar of the other user who is scheduled to have the communication moves in the residence.

According to an embodiment of the present disclosure, when the avatars of the users who are in the communication are moved out of the predefined place after the communication between the terminals is established, the control unit may cause the communication between the terminals to be disconnected.

According to an embodiment of the present disclosure, in a case where the predefined place is a room inside a building and the avatar of the predetermined user who is scheduled to have the communication is in the room, the control unit may cause the communication between the terminals to be established when the avatar of the other user who is scheduled to have the communication enters the building.

According to an embodiment of the present disclosure, in a case where the avatar of the predetermined user who is scheduled to have the communication is in the predefined place, the control unit may cause the communication between the terminals to be established when the other user who is scheduled to have the communication designates a schedule of the communication on a schedule of the other user.

According to an embodiment of the present disclosure, the information processing system may further include a transmission control unit configured to transmit a message to the users who have not moved the avatars to the predefined place when a scheduled start time of the communication arrives.

According to an embodiment of the present disclosure, the transmission control unit may transmit a message of SMS to mobile terminals used by the users who have not moved the avatar to the predefined place.

According to an embodiment of the present disclosure, positions of avatars operated by users in a virtual space is to be managed, a schedule of communication of the users is to be managed, and communication is to be established between terminals used by the users who are scheduled to have the communication when the avatars of the users who are scheduled to have the communication gather in a predefined place in the virtual space and causing at least one of an image and a voice to be transmitted and received.

Advantageous Effects of Invention

According to an embodiment the present technology, real-time communication that uses images and voices can be easily started.

BRIEF DESCRIPTION OF DRAWINGS

FIG. 10 is a diagram showing an example of a data structure of position information.

FIG. 14 is a diagram showing an example of user information.

DESCRIPTION OF EMBODIMENTS

Example of Connection of a Virtual Space Providing System

Figure 1:
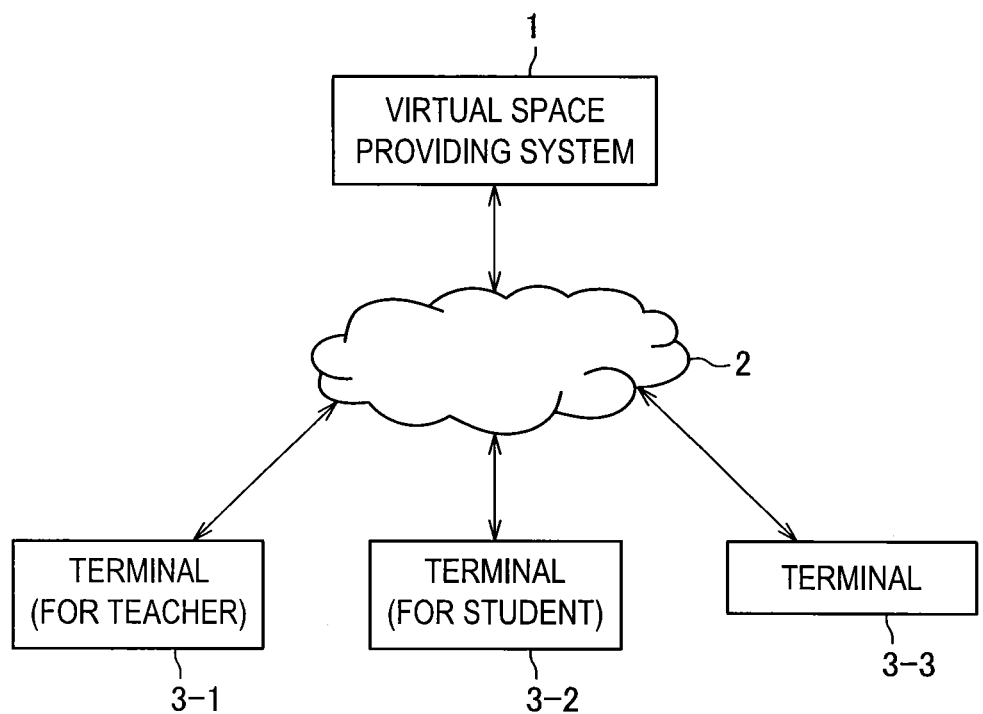
FIG. 1 is a diagram illustrating an example of connection between a virtual space providing system and terminals according to an embodiment of the present technology.

FIG. 1 is a diagram illustrating an example of connection between a virtual space providing system and terminals according to an embodiment of the present technology.

Figure 2:
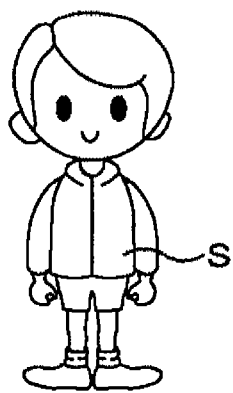
FIG. 2 is a diagram illustrating an appearance of an avatar.

The virtual space providing system 1 of FIG. 1 is configured as one or a plurality of servers, which provide a virtual space service to terminal users that access the servers via the Internet 2. Each of the terminal users that accesses the virtual space providing system 1 performs various activities in the virtual space by operating an avatar that has the same appearance of a student avatar S as illustrated in FIG. 2 displayed on a display of the terminal. Each user operates the avatar and is thereby able to, for example, perform communication with another user through their avatars or use content such as movies, games, and the like.

The terminals 3-1 to 3-3 are electronic devices such as personal computers, mobile telephones, portable games, and the like. In the example of FIG. 1, the three terminals 3-1 to 3-3 are connected to the virtual space providing system 1, however, more terminals are connected to the virtual space providing system 1 in reality.

Each of the terminals 3-1 to 3-3 is provided with a microphone, a speaker, and a camera in addition to the display on which various images are displayed. The users of the terminals 3-1 to 3-3 can perform real-time communication with another terminal user using images and voices by accessing the virtual space providing system 1 according to a schedule set in the virtual space.

When the users of the terminal 3-1 and the terminal 3-2 perform communication, for example, the terminals 3-1 and 3-2 photograph the counterpart users, and collect voices thereof using the microphones. The image and the voice acquired by the terminal 3-1 (the image and the voice of the user of the terminal 3-1) are transmitted to the terminal 3-2 via the Internet 2 and, appropriately, the virtual space providing system 1 and thereby output to the terminal 3-2. On the other hand, the image and the voice acquired by the terminal 3-2 (the image and the voice of the user of the terminal 3-2) are transmitted to the terminal 3-1 via the Internet 2 and, appropriately, the virtual space providing system 1 and thereby output to the terminal 3-1.

Accordingly, the users of the terminal 3-1 and the terminal 3-2 can have a conversation through voice while viewing each other's faces in real time. The virtual space providing system 1 realizes a conference conducted by a plurality of users or a lesson between a teacher and one student or a plurality of students using such real-time communication.

Hereinafter, a case of a lesson offered using real-time communication will be mainly described. The terminal 3-1 is assumed to be a terminal of a teacher who gives the lesson and appropriately referred to as a teacher terminal 3-1. In addition, the terminal 3-2 is assumed to be a terminal of a student who receives the lesson and appropriately referred to as a student terminal 3-2. The student avatar S of FIG. 2 is an avatar of the user of the terminal 3-2. The terminals 3-1 to 3-3 are collectively referred to as the terminal 3 unless there is a necessity to distinguish them.

Regarding the Virtual Space

[Configuration of the Virtual Space]

Figure 3:
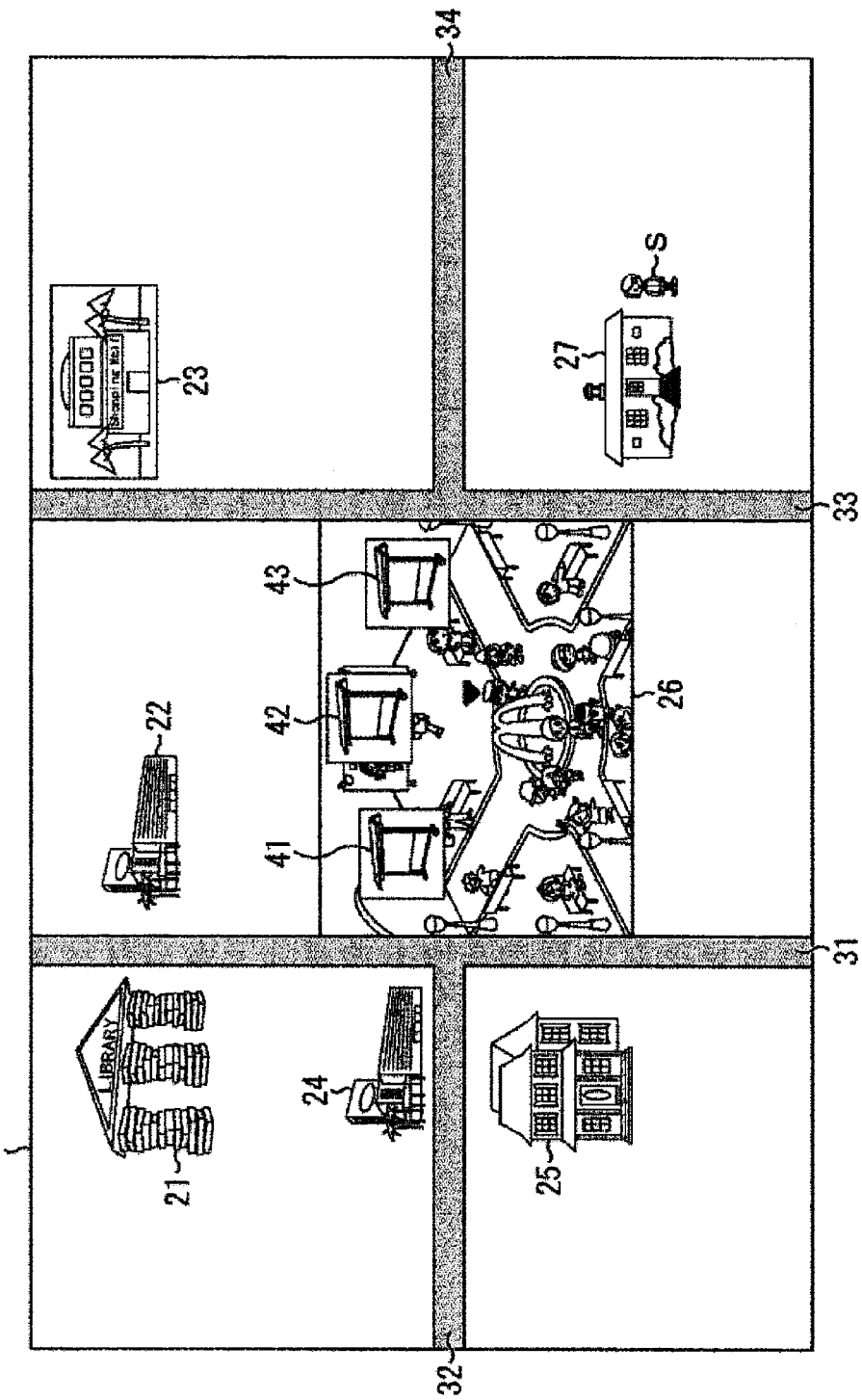
FIG. 3 is a diagram illustrating an overall configuration example of a virtual space.

FIG. 3 is a diagram illustrating an overall configuration example of the virtual space 11 provided by the virtual space providing system 1.

In the virtual space 11, a town is formed and buildings, roads, a square, and the like are prepared. In the example of FIG. 3, a communication square 26 is provided substantially at the center of the virtual space 11. On the left side of the communication square 26, a road 31 stretching in the vertical direction and a road 32 stretching in the horizontal direction are provided, and on the right side thereof, a road 33 stretching in the vertical direction and a road 34 stretching in the horizontal direction are provided.

As the buildings in the virtual space 11, a library 21 is provided on the upper left side of the virtual space 11, and a game center 22 is provided in the position across the road 31 from the library 21. In addition, a shopping mall 23 is provided on the upper right side of the virtual space 11, and a movie theater 24 is provided in the position across the road 31 from the communication square 26. A house 25 is provided in the position across the road 32 from the movie theater 24, and a house 27 is provided in the position across the road 33 from the communication square 26.

The communication square 26 is a place in which communication with another user such as chatting can be performed. A user can conduct, for example, chatting with another user of an avatar by moving his or her avatar to a position in the communication square 26 in which the counterpart avatar is placed and performing a predetermined operation.

In the communication square 26, bulletin boards 41 to 43 are prepared. The user can view posted information or post information by moving his or her avatar to the positions of the bulletin boards 41 to 43 and performing a predetermined operation. When the predetermined operation is performed in the state in which the avatar is positioned in front of the bulletin boards 41 to 43, a screen of the bulletin board site instead of a screen of the communication square 26 is displayed on the display of the terminal 3.

The library 21 is a building in which content of books can be used. When the user moves his or her avatar to the position of the library 21, a screen showing the inside of the library 21 is displayed on the display of the terminal 3.

Figure 4:
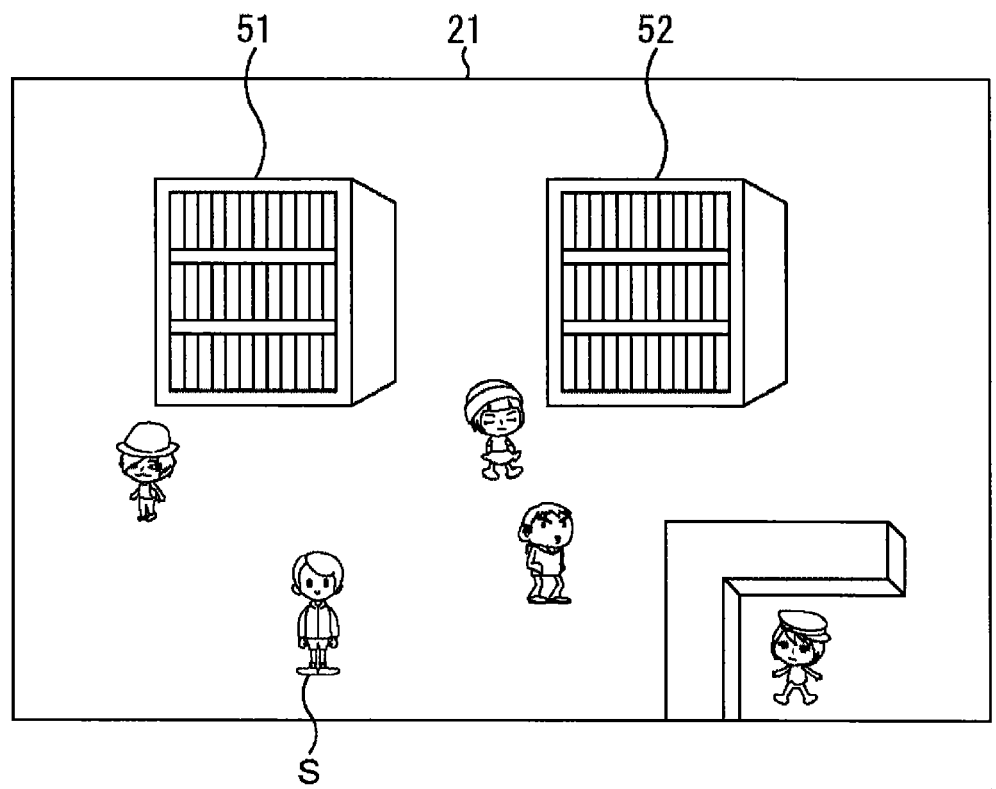
FIG. 4 is a diagram illustrating an example of the inside of a library.

FIG. 4 is a diagram illustrating an example of the inside of the library 21. In the library 21, bookshelves 51 and 52 are prepared. The user of the student terminal 3-2 can, for example, select a book by bringing the student avatar S close to the bookshelves 51 and 52 and then performing a predetermined operation.

When the book is selected, data of the book is transmitted to the student terminal 3-2 from the virtual space providing system 1, and a screen showing the content of the book is displayed on the display of the student terminal 3-2, instead of a screen showing the inside of the library 21. Accordingly, the user of the student terminal 3-2 can view the selected book inside the virtual space 11.

In other buildings, facilities that enable use of content or shopping are also prepared like in the library 21.

The game center 22 is a building in which, for example, game content relating to education can be used. When the user moves his or her avatar to the position of the game center 22, a screen showing the inside of the game center 22 is displayed on the display of the terminal 3. Game devices are prepared in the game center 22 according to each type of games. The user can select a game device by moving his or her avatar in front of the game device and then performing a predetermined operation.

When the game device is selected, data of the game is transmitted to the terminal 3 from the virtual space providing system 1, and a screen of the game is displayed on the display of the terminal 3, instead of a screen of the inside of the game center 22. Accordingly, the user of the terminal 3 can enjoy the selected game in the virtual space 11.

The shopping mall 23 is a building in which shopping can be done. When the user moves his or her avatar to the position of the shopping mall 23, a screen showing the inside of the shopping mall 23 is displayed on the display of the terminal 3. A plurality of shops are prepared in the shopping mall 23. The user can select a shop by moving his or her avatar in front of the shop and then performing a predetermined operation.

When the shop is selected, data of the shopping site or product is transmitted to the terminal 3 from the virtual space providing system 1, and a purchase screen of the shopping site or product is displayed on the display of the terminal 3, instead of a screen of the inside of the shopping mall 23. Accordingly, the user of the terminal 3 can do shopping in the virtual space 11.

The movie theater 24 is a building in which content of movies can be used. When the user moves his or her avatar to the position of the movie theater 24, a screen showing the inside of the movie theater 24 is displayed on the display of the terminal 3. In the movie theater 24, a plurality of rooms (sub block areas) are prepared, and movies to be provided are allocated to each room. The user can select a movie allocated to a predetermined room by moving his or her avatar to the room.

When the movie is selected, data of the movie is transmitted to the terminal 3 from the virtual space providing system 1, and images of the movie are displayed on the display of the terminal 3, instead of a screen of the inside of the movie theater 24. In addition, sound is output from the speaker. Accordingly, the user of the terminal 3 can view the selected movie in the virtual space 11.

The house 25 is a house of a teacher with a room (classroom) allocated to the user who acts as a teacher. A room allocated to the user of the teacher terminal 3-1 is also present in the house 25.

Figure 5:
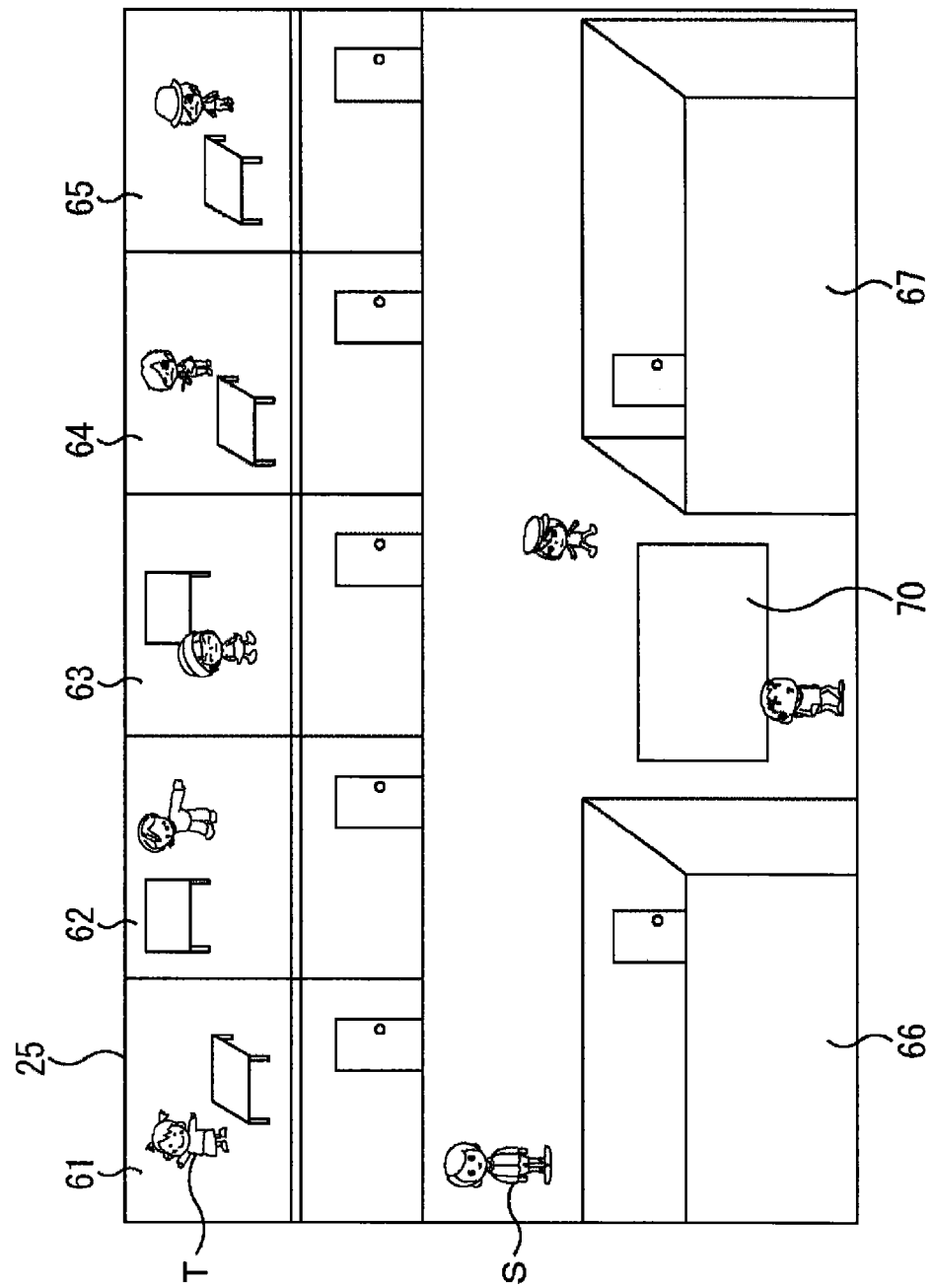
FIG. 5 is a diagram illustrating an example of the inside of a house of a teacher.

FIG. 5 is a diagram illustrating an example of the inside of the house 25 of the teacher. The house 25 of the teacher is provided with rooms 61 to 65 side by side, and provided with rooms 66 and 67 and a reception counter 70 on the opposite side with a passage therebetween.

When the user of the teacher terminal 3-1 logs in to the virtual space providing system 1, a screen of a state in which a teacher avatar T that is an avatar of the user of the teacher terminal 3-1 is in the room 61 allocated as a teacher's room is displayed on the display of the teacher terminal 3-1. The user of the teacher terminal 3-1 inputs a time at which a lesson can be offered by performing, for example, a predetermined operation when the teacher avatar T is in the room 61. Information relating to scheduled lessons is registered in a user information management unit 152 of a virtual space management server 103 to be described later in association with the ID of the user of the teacher terminal 3-1, or the like.

The house 27 of FIG. 3 is a house allocated to the user of the student terminal 3-2. When the user of the student terminal 3-2 logs in to the virtual space providing system 1, a screen of a state in which the student avatar S is in its room is displayed on the display of the student terminal 3-2. The user of the student terminal 3-2 can make a reservation of a lesson by moving the student avatar S outside of the house 27 as shown in FIG. 3, or performing a predetermined operation when the student avatar S is inside the house 27. In other words, if the student avatar S makes a request for the area of specialty of the teacher from whom the student wants to receive a lesson or a designation of a desired lesson time, the profile of the teacher registered in advance and the time at which the lesson can be offered is searched for in the user information management unit 152 to be described later, and lists of teachers that meet the condition and times at which the lesson can be offered are displayed on the student terminal 3-2. The student (the user of the student terminal 3-2) selects one teacher and a time from the lists, thereby completing the reservation of the lesson. The reserved lesson time is registered as a schedule of the selected teacher and the student avatar S in the user information management unit 152 of the virtual space management server 103.

As described above, the virtual space 11 is provided with the buildings in which the content relating to education can be used and lessons can be offered, the houses which are allocated to the users as occupiable spaces, and the like. Since such an on-line lesson service is provided with other education-related services such as educational content, or games that exhibit educational effects in the same virtual space 11, the users can obtain greater educational effects by effectively combining the services. It should be noted that the virtual space 11 is provided with various buildings other than those shown in FIG. 3.

Figure 6:
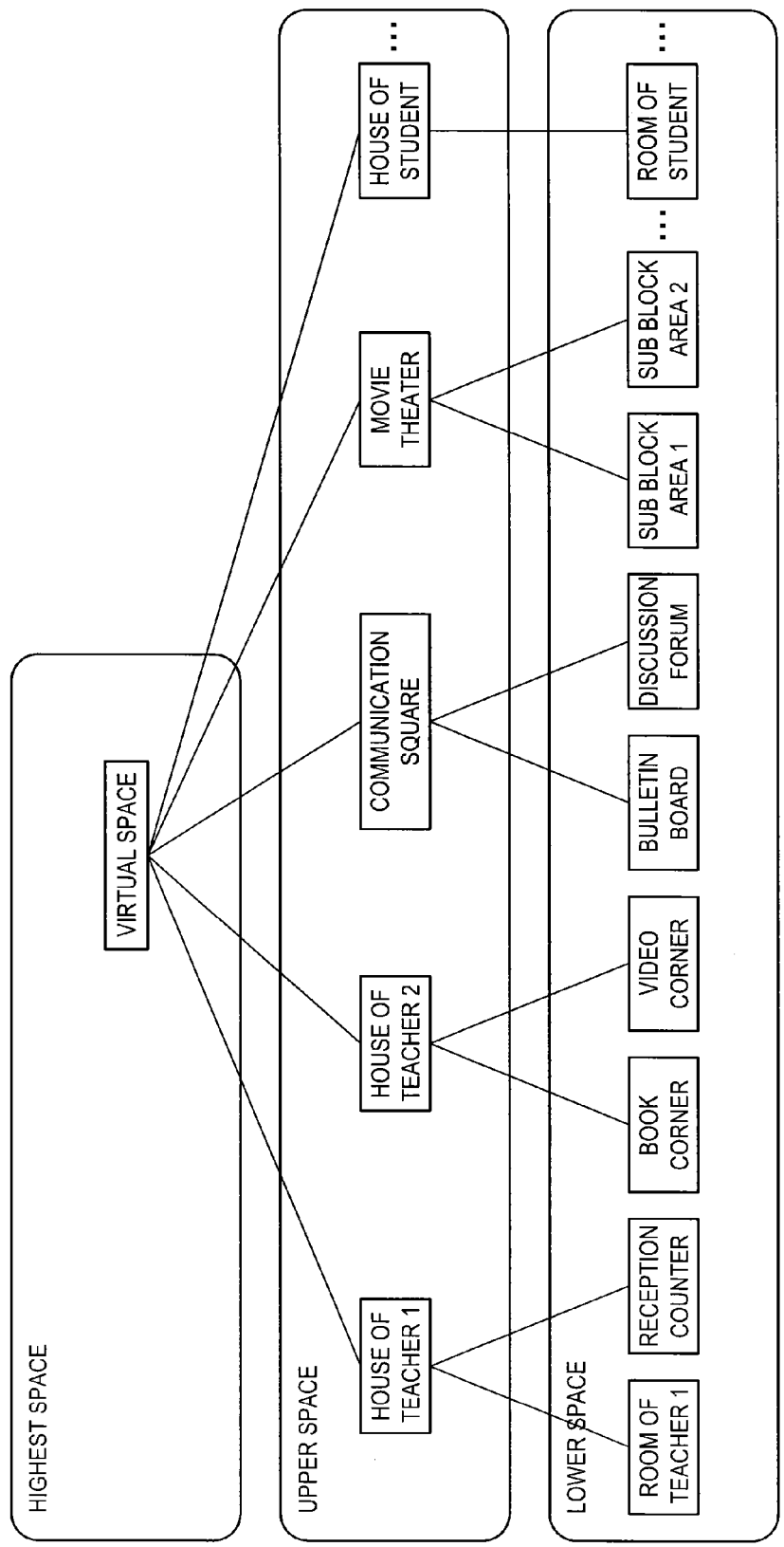
FIG. 6 is a diagram illustrating an example of a data structure of the virtual space.

FIG. 6 is a diagram illustrating an example of a data structure of the virtual space 11.

Each space inside the virtual space 11 is managed by the virtual space providing system 1 in the form of a hierarchical structure. The virtual space 11 corresponds to the highest space, and each building and the square of FIG. 3 correspond to the upper space. In the example of FIG. 6, the house of a teacher 1, the house of a teacher 2, the communication square 26, the movie theater 24, and the house 27 of a student are shown as the upper space.

As the lower space, the house of the teacher 1 has a room of the teacher 1 and the reception counter, and the house of the teacher 2 has a book corner and a video corner. In addition, as the lower space, the communication square 26 has the bulletin boards and a discussion forum, and the movie theater 24 has sub block area 1 and 2. The house 27 of the student has a room of the student (the room of the student avatar S).

[Management of a Position of an Avatar]

Figure 7:
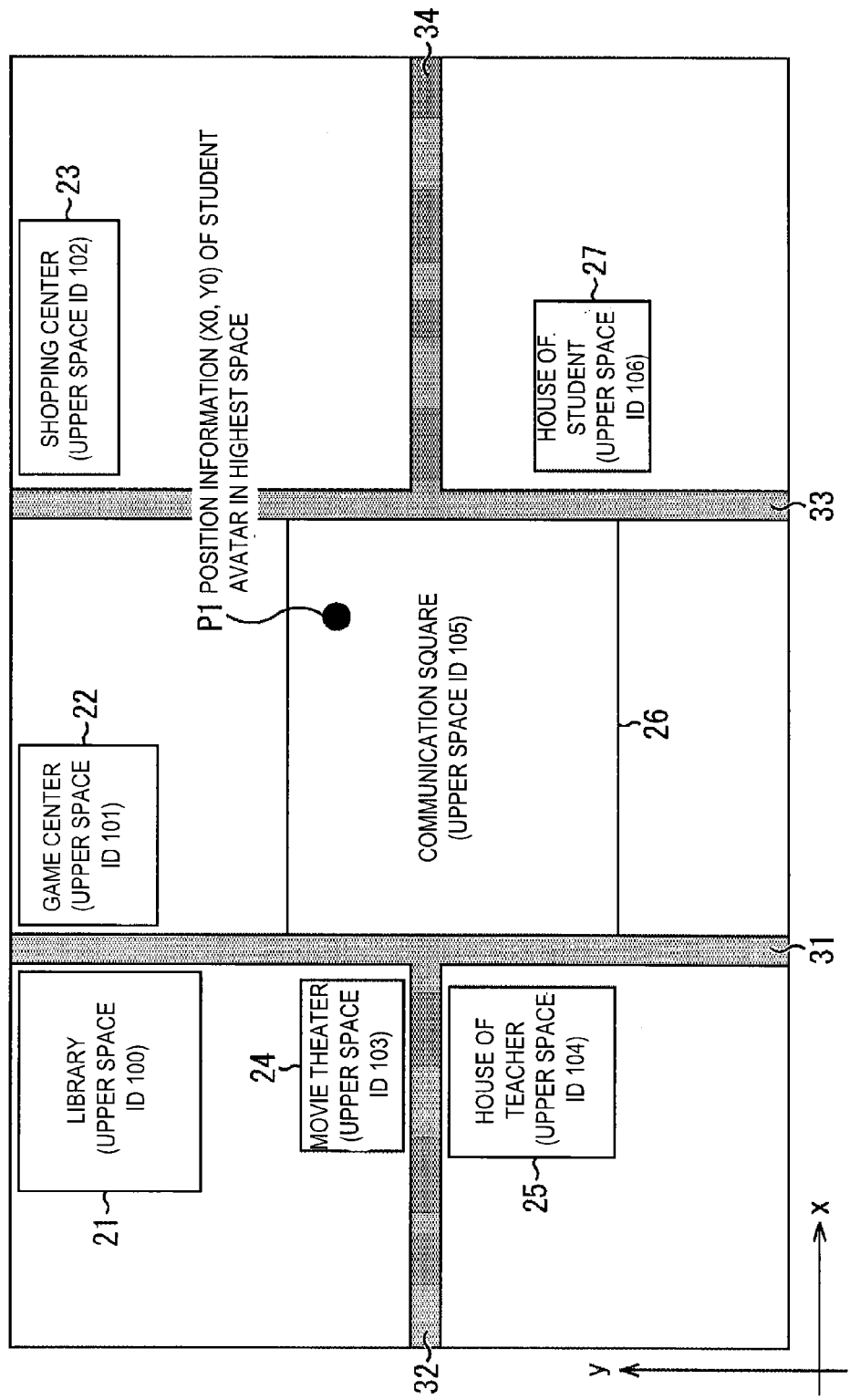
FIG. 7 is a diagram illustrating examples of space IDs in an upper space.

FIG. 7 is a diagram illustrating examples of space IDs allocated in the upper space. Positions of the avatars of the users are managed using space IDs.

In the example of FIG. 7, the space ID of the library 21 is ID 100, and the space ID of the game center 22 is ID 101. In addition, the space ID of the shopping mall 23 is ID 102, and the space ID of the movie theater 24 is ID 103. The space ID of the house 25 of the teacher is ID 104, the space ID of the communication square 26 is ID 105, and the space ID of the house 27 of the student is ID 106.

The position P1 denoted by a black circle indicates the position of the student avatar S in the virtual space 11 that is the highest space. In the example of FIG. 7, the position of the student avatar S is assumed to be a position denoted by values (X0, Y0) in the communication square 26. A position in each space is denoted by values on the X and Y coordinates with a predetermined position such as the lower-left corner of each space as an origin.

Figure 8:
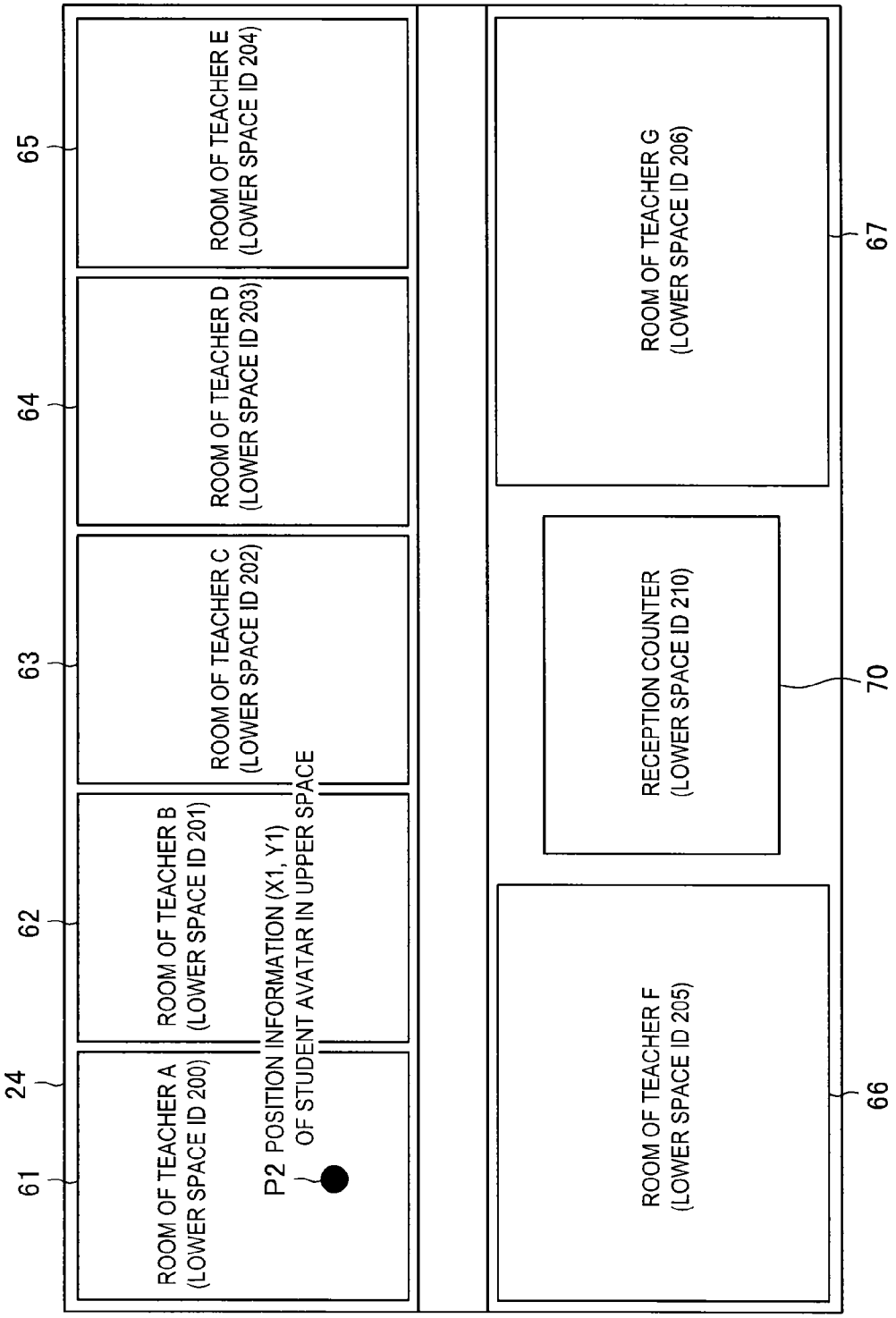
FIG. 8 is a diagram illustrating examples of space IDs in a lower space.

FIG. 8 is a diagram illustrating examples of space IDs allocated to rooms of the house 25 of the teacher.

As described with reference to FIG. 5, the house 25 of the teacher is provided with the rooms 61 to 67 and the reception counter 70. In the example of FIG. 8, the rooms 61 to 67 are set to be rooms of teachers A to G. The space IDs of the rooms 61 to 67 are set to be ID 200 to ID 206. In addition, the space ID of the reception counter 70 is ID 210.

The position P2 is a position of the student avatar S in the house 25 of the teacher that is included in the upper space. In the example of FIG. 8, the position of the student avatar S is set to be a position in the room 61 denoted by values (X1, Y1).

Figure 9:
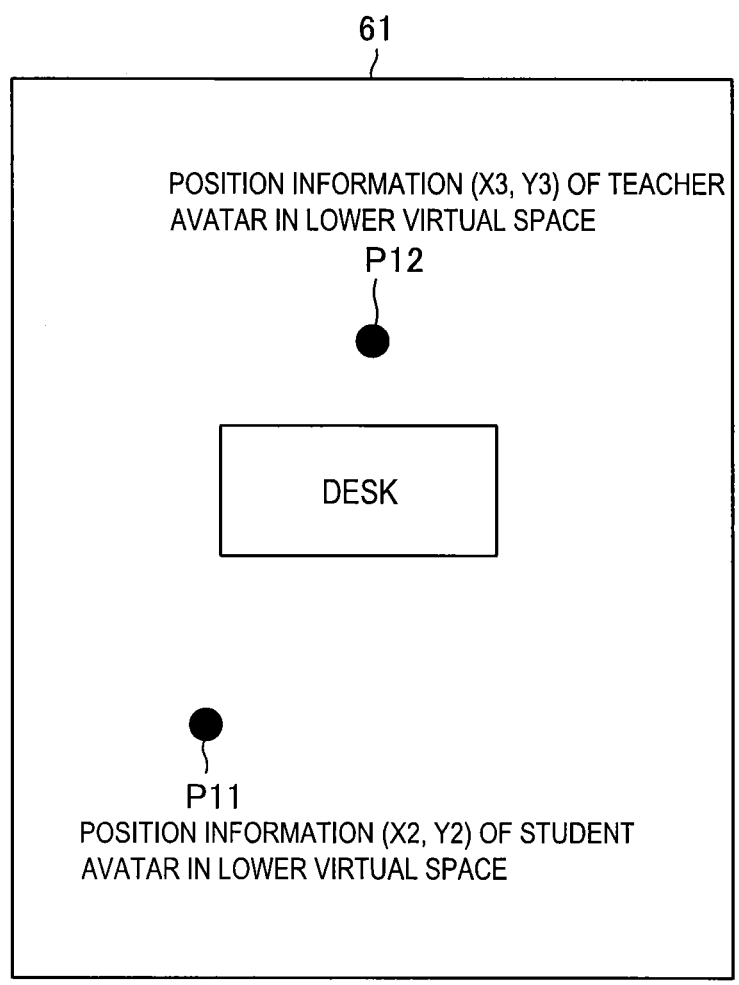
FIG. 9 is a diagram showing a configuration of a layout inside a room.

FIG. 9 is a diagram showing a configuration of a layout inside the room 61. In the example of FIG. 9, a desk is disposed substantially at the center of the room 61. The student avatar S is present in the position P11 below the desk denoted by values (X2, Y2) and the teacher avatar T is present in the position P12 above the desk denoted by values (X3, Y3).

FIG. 10 is a diagram showing an example of a data structure of position information. The virtual space providing system 1 manages the position of each avatar in the virtual space 11 using information that has the data structure as shown in A of FIG. 10.

The position information has the structure in which position information (values on the X and Y coordinates) in the highest space, the upper space ID, position information of the upper space, the lower space ID, and position information of the lower space are arranged in this order.

When the student avatar S is in the room 61 inside the house 25 of the teacher as illustrated in FIG. 9, for example, values (X10, Y10) on the X and Y coordinates indicating the position of the house 25 of the teacher are set as the position information of the highest space as shown in B of FIG. 10. In addition, the ID 104 (FIG. 7) that is the ID of the house 25 of the teacher is set as the upper space ID, and values (X1, Y1) (FIG. 8) on the X and Y coordinates indicating the position of the room 61 are set as the position information of the upper space. ID 200 that is the ID of the room 61 is set as the lower space ID, and values (X2, Y2) on the X and Y coordinates indicating the position inside the room 61 are set as the position information of the lower space.

Based on the position information that has the above data structure, the virtual space providing system 1 can specify in what position in which space each avatar is present. Specifying the position of each avatar is used in, for example, controlling connection of communication between terminals.

When provision of a lesson by the user of the teacher terminal 3-1 to the user of the student terminal 3-2 is scheduled and the scheduled time to start the lesson arrives, the virtual space providing system 1 specifies the position of the teacher avatar T and the position of the student avatar S. As a result, when the teacher avatar T and the student avatar S are determined to be present in the same room in which the lesson is scheduled as illustrated in FIG. 9, the virtual space providing system 1 establishes communication between the teacher terminal 3-1 and the student terminal 3-2. For example, the presence of the teacher avatar T and the student avatar S in the same room is determined based on the fact that the lower space ID included in the position information of the teacher avatar T is the same as the lower space ID included in the position information of the student avatar S.

After the establishment of communication, images and voices are transmitted and received between the teacher terminal 3-1 and the student terminal 3-2, and thereby the lesson is offered based on real-time communication.

Accordingly, at the start of the lesson, respective users of the teacher terminal 3-1 and the student terminal 3-2 can establish communication by performing an easy operation such as moving their own avatars without performing a calling operation such as selecting the IP address of the counterpart terminal by themselves. A series of processes performed to establish communication between the teacher terminal 3-1 and the student terminal 3-2 will be described later.

Configuration of Each Device

[Configuration of the Virtual Space Providing System]

Figure 11:
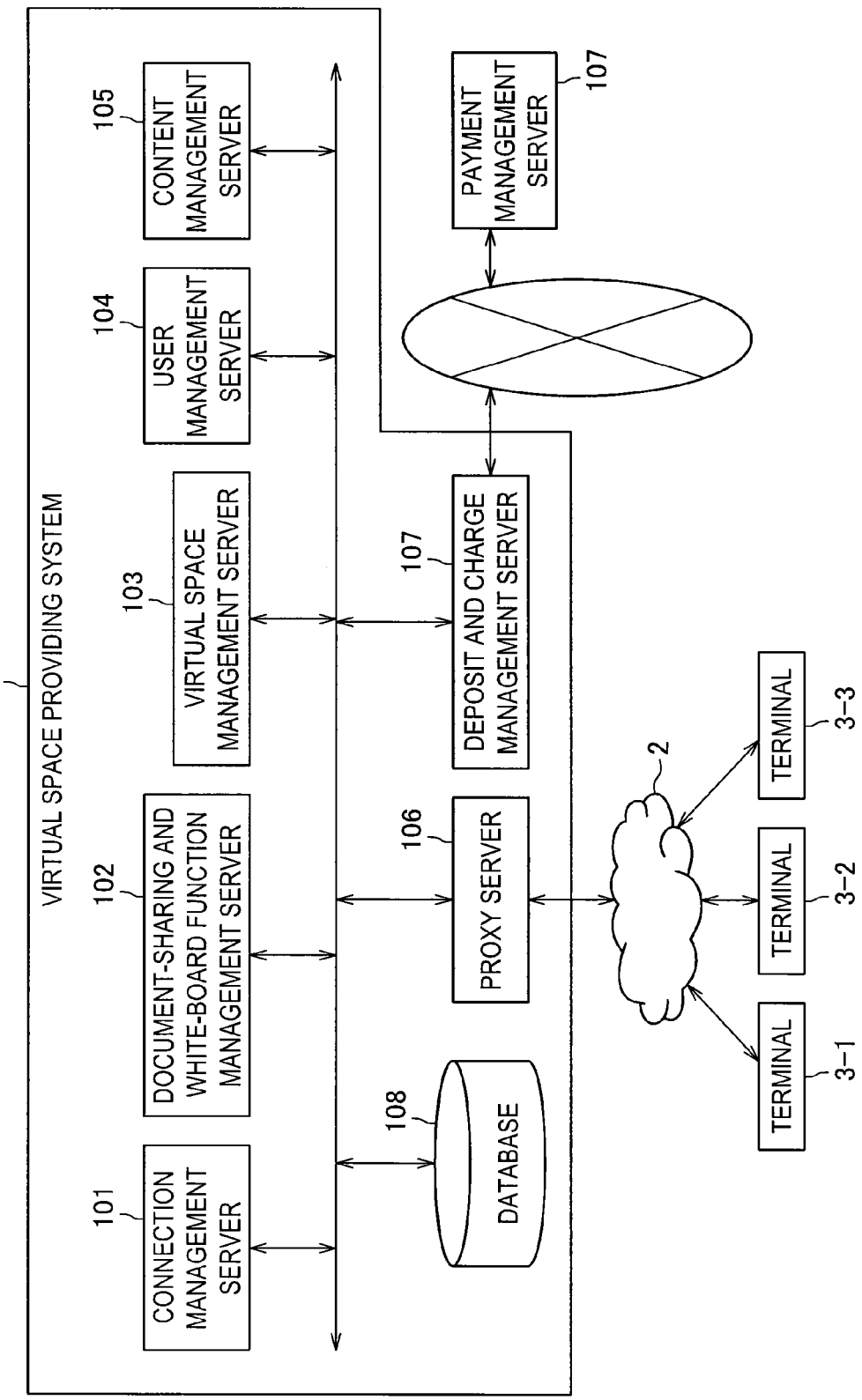
FIG. 11 is a diagram showing a configuration example of a virtual space providing system.

FIG. 11 is a diagram showing a configuration example of the virtual space providing system 1.

The virtual space providing system 1 is configured such that a connection management server 101, a document-sharing and white-board function management server 102, the virtual space management server 103, a user management server 104, a content management server 105, a proxy server 106, a deposit and charge management server 107, and a database 108 are connected to one another via a network 109. The network 109 may be an intranet including a LAN (Local Area Network), or the like or may be the Internet.

The connection management server 101 manages communication between the terminals 3. When the virtual space management server 103 instructs the establishment of communication between the teacher terminal 3-1 and the student terminal 3-2, for example, the connection management server 101 transmits, to one of the teacher terminal 3-1 and the student terminal 3-2, information instructing to make a call to the other terminal. The information transmitted to the terminal 3 that is a call source includes the IP address for specifying the other terminal 3 that is a call destination and call information that is information for making a call such as a telephone number.

When making a call to the teacher terminal 3-1 is instructed, for example, the student terminal 3-2 makes a call to the teacher terminal 3-1 based on the call information notified of by the connection management server 101. When a response from the teacher terminal 3-1 is received, the student terminal 3-2 starts communication for a lesson that is communication used in lessons with the teacher terminal 3-1.

The document-sharing and white-board function management server 102 manages a document-sharing function. The document-sharing function is a function of sharing teaching materials such as text and images between the users of the terminals 3 performing the communication for lesson. When a file of a teaching material is selected and transmitted in the teacher terminal 3-1, for example, the document-sharing and white-board function management server 102 transfers the transmitted file to the student terminal 3-2 so that the user of the student terminal 3-2 reads the teaching material by hearing.

In addition, the document-sharing and white-board function management server 102 manages a white-board function. The white-board function is a function of enabling figures or handwritten text written on a pen tablet 173 (FIG. 15) by the user of one terminal 3 performing the communication for a lesson to be read by the user of the other terminal 3. When an image such as handwritten text input on the pen tablet 173 is transmitted, the document-sharing and white-board function management server 102 transfers and displays the transmitted image to the student terminal 3-2.

The virtual space management server 103 controls overall processes performed to provide the virtual space service. For example, the virtual space management server 103 transmits and displays information of screens of the inside of the virtual space 11 to the terminal 3 that logs in to the virtual space providing system 1. In addition, the virtual space management server 103 manages the position of each avatar based on the position information. The virtual space management server 103 manages not only the position information but also various kinds of information such as the type of an avatar, information relating to a residence of the avatar, and a schedule in association with user IDs.

Furthermore, when a movie is selected in the movie theater 24, the virtual space management server 103 transmits information relating to the selected movie to the content management server 105 to distribute the movie content. The virtual space management server 103 also transmits the information relating to the selected movie to the deposit and charge management server 107 to charge a fee for the movie content. When payment of the fee in the virtual space 11 is performed in, for example, a pre-payment system, the payment is made in the deposit and charge management server 107 by subtracting money paid in advance by the user who uses the content from the fee for the content.

The user management server 104 manages log-in and log-off of the users with respect to the virtual space providing system 1. When there is an access from the terminal 3, for example, the user management server 104 causes a log-in screen to be displayed on the terminal 3, and when input user ID and password match information registered in advance, the information of the user ID and the like is transmitted to the virtual space management server 103.

The content management server 105 manages provision of various kinds of content such as books, games, and movies. The content management server 105 reads content selected by a user from the database 108 and transmits the content to the terminal 3 according to control by the virtual space management server 103.

The proxy server 106 manages communication between each server and the terminals 3 in the virtual space providing system 1.

The deposit and charge management server 107 manages payment made in the virtual space 11 by performing communication with a payment management server 122 via an external network 121.

The database 108 stores various kinds of information such as user information, position information, and content that can be used in the virtual space 11. The information stored in the database 108 is appropriately read by each server.

It should be noted that the virtual space providing system 1 may have at least the virtual space management server 103. The connection management server 101 to the deposit and charge management server 107 and the database 108 can be provided outside the virtual space providing system 1. The functions of the servers may be realized by one computer, or may be realized by a plurality of computers.

Figure 12:
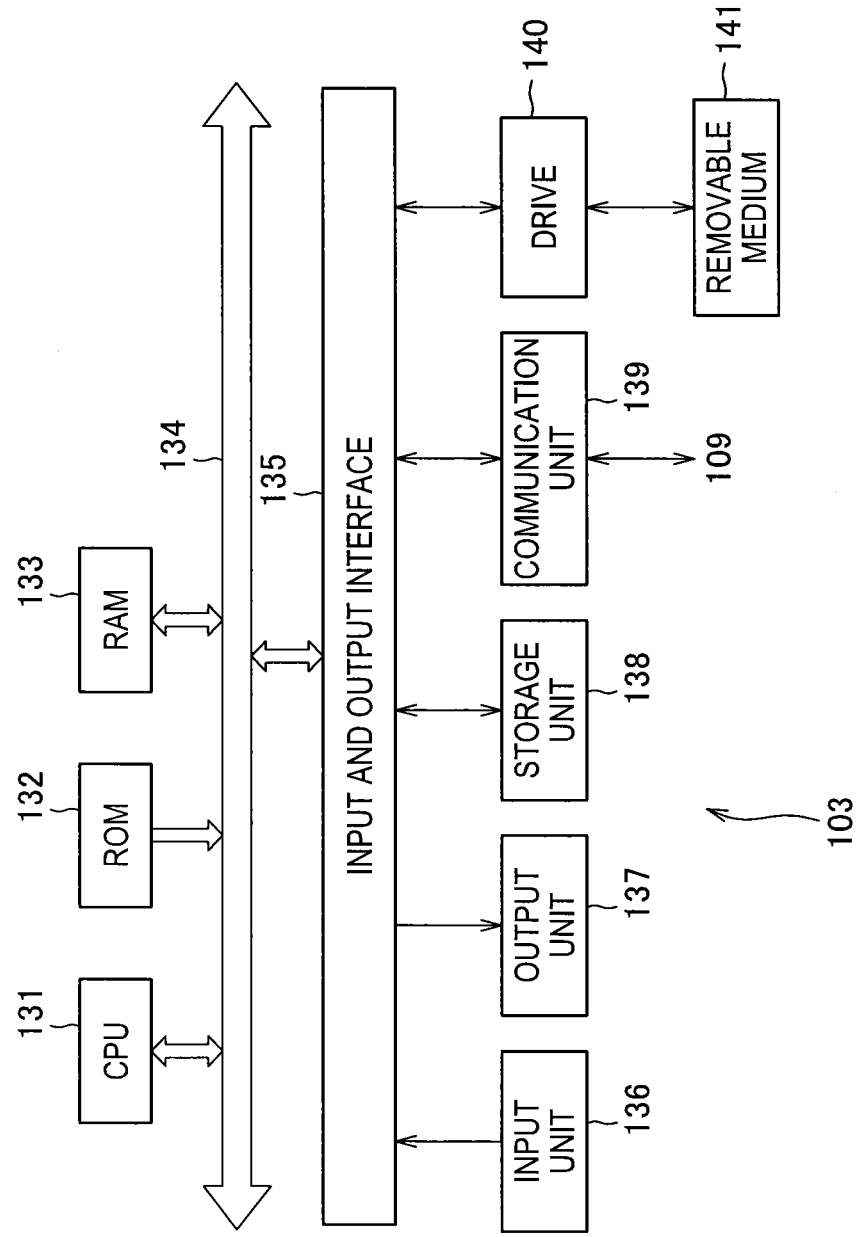
FIG. 12 is a block diagram showing a configuration example of hardware of a virtual space management server.

FIG. 12 is a block diagram showing a configuration example of hardware of the virtual space management server 103. Other servers of FIG. 11 also have the same configuration as those of the virtual space management server 103 shown in FIG. 12.

A CPU (Central Processing Unit) 131, a ROM (Read Only Memory) 132, and a RAM (Random Access Memory) 133 are connected to one another via a bus 134.

An input and output interface 135 is further connected to the bus 134. An input unit 136 such as a keyboard and a mouse and an output unit 137 such as a display and a speaker are connected to the input and output interface 135. In addition, a storage unit 138 such as a hard disk or a non-volatile memory, a communication unit 139 such as a network interface, and a drive 140 that drives a removable medium 141 are connected to the input and output interface 135.

Figure 13:
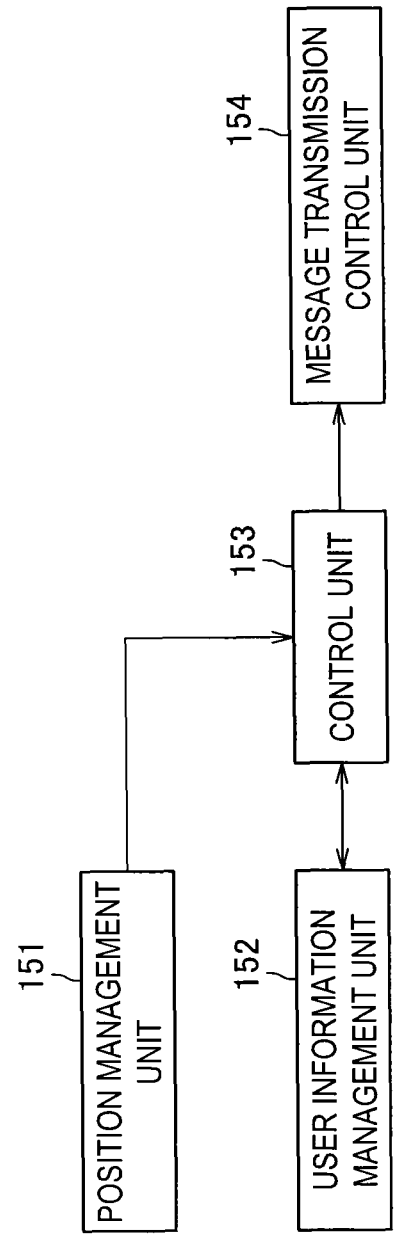
FIG. 13 is a block diagram showing a functional configuration example of the virtual space management server.

FIG. 13 is a block diagram showing a functional configuration example of the virtual space management server 103. At least some functional units shown in FIG. 13 are realized by the CPU 131 of FIG. 12 by executing a predetermined program. In the virtual space management server 103, a position management unit 151, the user information management unit 152, a control unit 153, and a message transmission control unit 154 are realized.

The position management unit 151 manages positions of the avatars present in the virtual space 11. When the user of the terminal 3 performs an operation for moving his or her avatar, the position management unit 151 specifies a position of the avatar based on information transmitted from the terminal 3. In addition, the position management unit 151 manages the positions of the avatars by generating the position information having the data structure of FIG. 10 and storing the position information in the database 108. Information regarding the space ID of each space and X and Y coordinates of the virtual space 11 is given to the position management unit 151.

The user information management unit 152 manages user information that is information on a user who logs into the virtual space providing system 1.

FIG. 14 is a diagram showing an example of the user information. The user information includes a user ID, avatar information, residence information, schedule information, message transmission destination information, and call information.

The avatar information is information indicating the type of avatar of a user. An avatar of a type specified in the avatar information is displayed by the control unit 153 in the virtual space 11. At the time of initial registration for using the virtual space 11, the type of avatar is selected by the user.

The residence information is information on a room (house) allocated to a user as an occupiable space.

The schedule information is information on a schedule in the virtual space 11. When a predetermined operation is performed in a state in which an avatar is present in its own residence, for example, a list of reserved lessons registered in the user information management unit 152 of the virtual space management server 103 is displayed on the display of the terminal 3. In addition, when a desired lesson is selected from the list of lessons and a fee is paid in a predetermined way such as a pre-payment system, a lesson is set as a schedule item of the user. The schedule information of a lesson of FIG. 14 includes a start time, a space ID indicating a venue for the lesson, and user IDs of participants (the user ID of the user of the teacher terminal 3-1 and the user ID of the user of the student terminal 3-2).

The message transmission destination information is information on, for example, the telephone number and e-mail address of a mobile telephone of a user. Notification to a user is performed using a message of SMS (Short Message Service) or e-mail.

Such user information that includes the information described above is read from the database 108 based on a user ID transmitted from the user management server 104 when a user logs in to the virtual space providing system 1, and acquired by the position management unit 151.

[Configuration of the Terminal]

Figure 15:
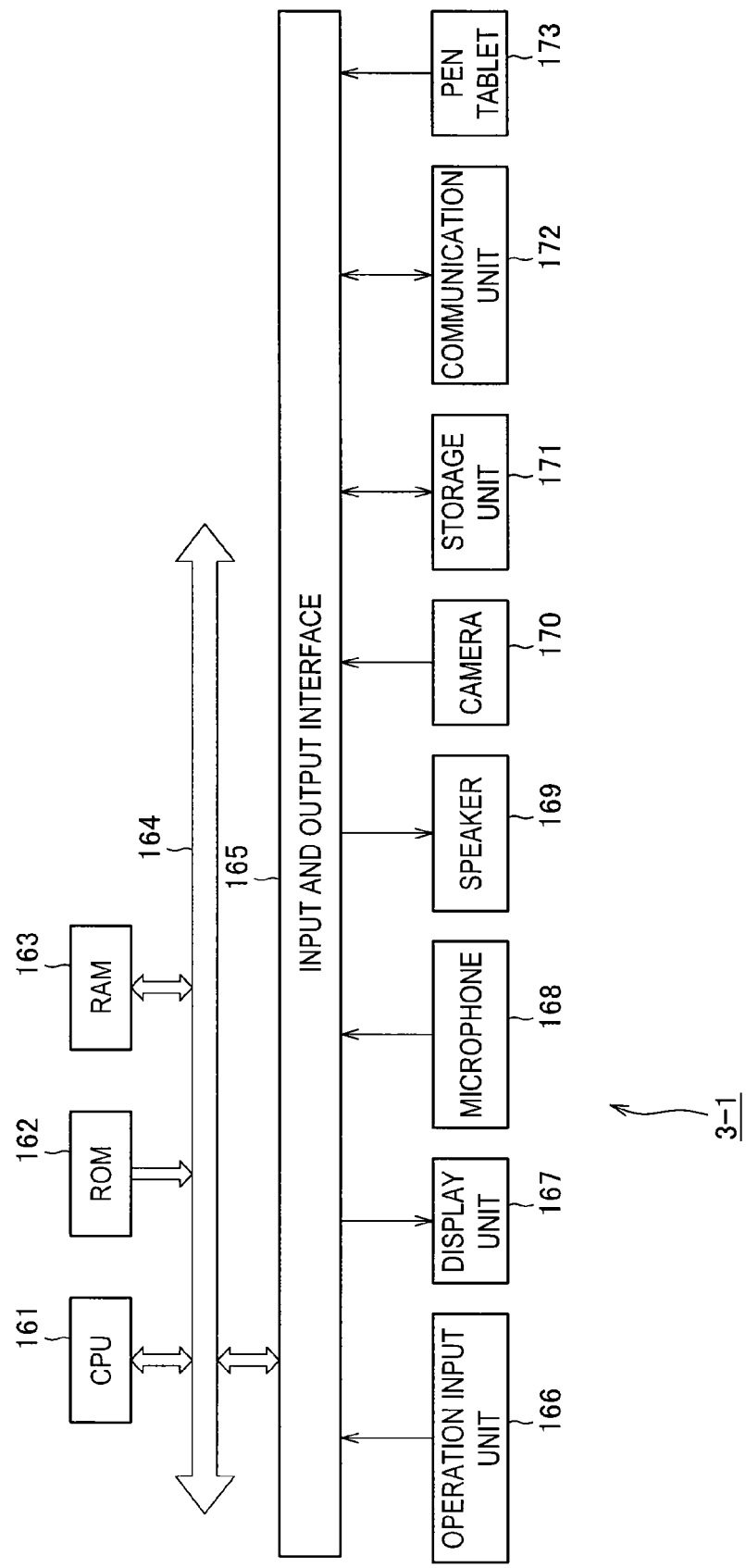
FIG. 15 is a block diagram showing a configuration example of hardware of a teacher terminal.

FIG. 15 is a block diagram showing a configuration example of hardware of the teacher terminal 3-1.

A CPU 161, a ROM 162, and a RAM 163 are connected to one another via a bus 164. An input and output interface 165 is further connected to the bus 164. An operation input unit 166 such as a keyboard and a mouse, a display unit 167 such as an LCD (Liquid Crystal Display), a microphone 168, and a speaker 169 are connected to the input and output interface 165. The microphone 168 and the speaker 169 are provided in, for example, a head-set and connected to the teacher terminal 3-1 via a cable or the like.

In addition, a camera 170 that is used by a user in photographing, a storage unit 171 such as a hard disk, a communication unit 172 that performs communication with the virtual space providing system 1 via the Internet 2, and the pen tablet 173 are connected to the input and output interface 165.

Figure 16:
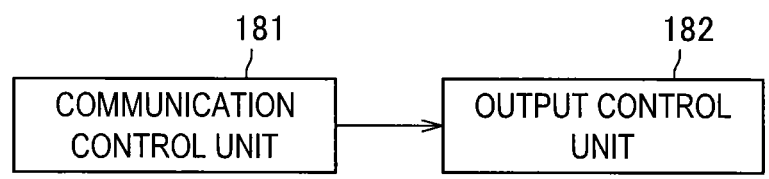
FIG. 16 is a block diagram showing a functional configuration example of the teacher terminal.

FIG. 16 is a block diagram showing a functional configuration example of the teacher terminal 3-1. At least some of the functional units shown in FIG. 16 are realized by the CPU 161 of FIG. 15 by executing a predetermined program. In the teacher terminal 3-1, a communication control unit 181 and an output control unit 182 are realized.

The communication control unit 181 performs communication with the virtual space providing system 1 and other terminals such as the student terminal 3-2 by controlling the communication unit 172. After the establishment of the communication for a lesson, for example, the communication control unit 181 transmits images photographed by the camera 170 and a voice collected by the microphone 168 to the student terminal 3-2 and receives images and the voice transmitted from the student terminal 3-2. The images and voice received by the communication control unit 181 are output to the output control unit 182.

The output control unit 182 controls display of the display unit 167 and output of the voice from the speaker 169.

The student terminal 3-2 also has the same configurations as those shown in FIGS. 15 and 16. Hereinafter, description will be provided by appropriately referring to the configurations of FIGS. 15 and 16 as those of the student terminal 3-2.

Process Sequence of Each Device

Processes of the virtual space management server 103, the teacher terminal 3-1, and the student terminal 3-2 which have the configurations as described above will be described. Herein, a process performed in the teacher terminal 3-1 and the student terminal 3-2 will be described, however, the same process is also performed between the virtual space management server 103 and another terminal 3.

First, a process of managing a position of an avatar will be described with reference to the flowchart of FIG. 17.

Figure 17:
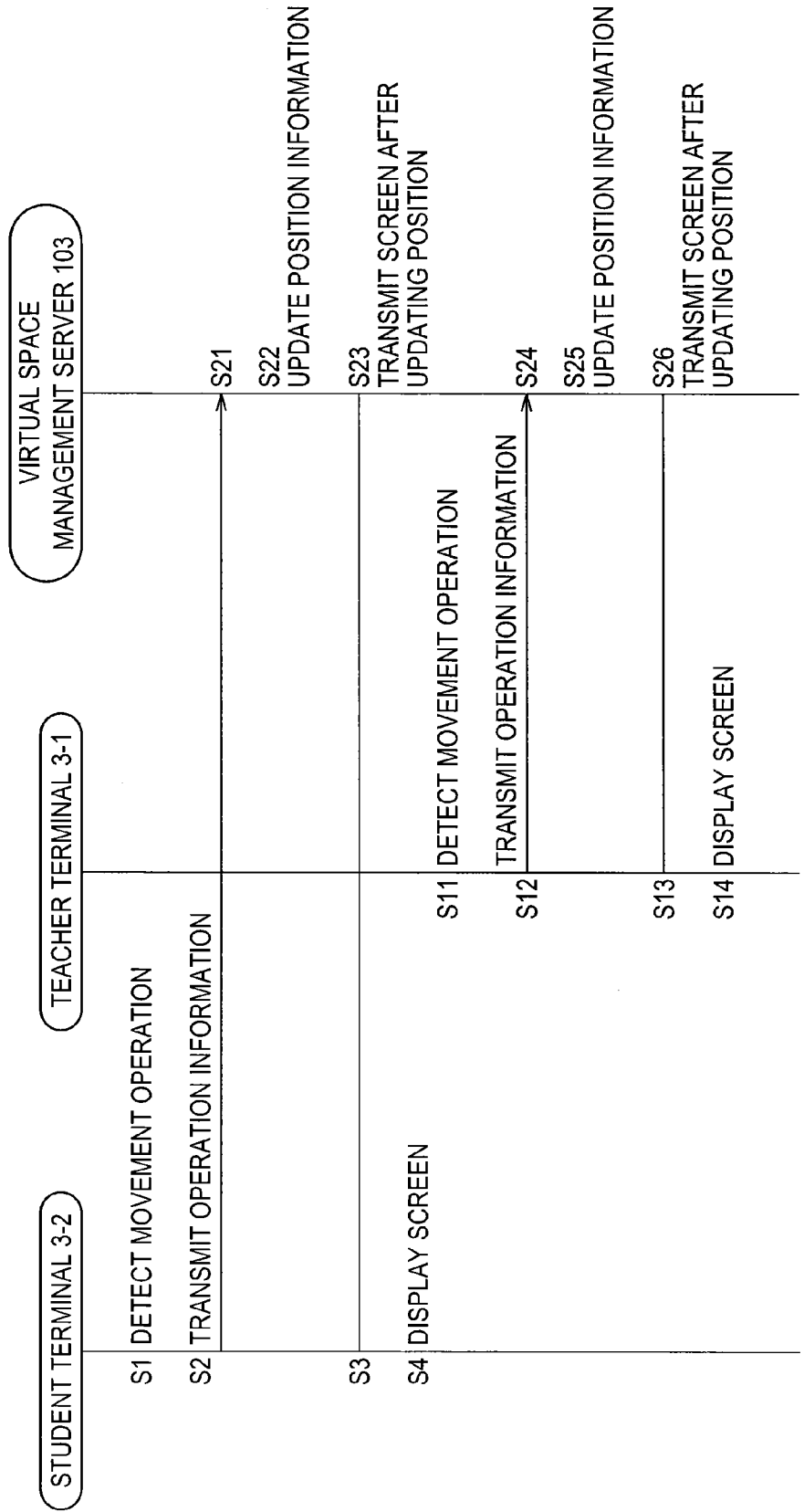
FIG. 17 is a flowchart for describing a process of managing a position of an avatar.

The process of FIG. 17 starts after the user of the teacher terminal 3-1 and the user of the student terminal 3-2 respectively access and log in to the virtual space providing system 1. When log-in is performed, the user management server 104 notifies the virtual space management server 103 of the user IDs of the user of the teacher terminal 3-1 and the user of the student terminal 3-2. On the display units 167 of the teacher terminal 3-1 and the student terminal 3-2, a screen of the inside of the virtual space 11 in which their avatars are included is displayed according to control of the control unit 153 of the virtual space management server 103.

In Step S1, the operation input unit 166 of the student terminal 3-2 detects an operation of the user for moving the student avatar S.

In Step S2, the communication control unit 181 transmits information indicating the content of the operation of the user to the virtual space management server 103.

In Step S21, the position management unit 151 (FIG. 13) of the virtual space management server 103 controls the communication unit 139 such that the information transmitted from the student terminal 3-2 is received.

In Step S22, the position management unit 151 moves the position of the student avatar S according to the operation of the user and updates position information of the student avatar S to indicate the position after the movement.

In Step S23, the control unit 153 transmits information of a screen of the virtual space 11 after the position is moved to the student terminal 3-2.

In Step S3, the communication control unit 181 of the student terminal 3-2 receives the information transmitted from the virtual space management server 103 and then outputs the information to the output control unit 182.

In Step S4, the output control unit 182 causes the screen of the inside of the virtual space 11 after the student avatar S is moved to be displayed on the display unit 167 based on the information transmitted from the virtual space management server 103. Then, every time the user performs the operation of moving the student avatar S, for example, to the room 61 in which a lesson is scheduled to be offered, the above process is repeated between the student terminal 3-2 and the virtual space management server 103.

On the other hand, in Step S11, the operation input unit 166 of the teacher terminal 3-1 detects an operation of the user for moving the teacher avatar T.

In Step S12, the communication control unit 181 transmits information indicating the content of the operation of the user to the virtual space management server 103.

In Step S24, the position management unit 151 of the virtual space management server 103 controls the communication unit 139 such that the information transmitted from the teacher terminal 3-1 is received.

In Step S25, the position management unit 151 moves the position of the teacher avatar T according to the operation of the user and updates position information of the teacher avatar T to indicate the position after the movement.

In Step S26, the control unit 153 transmits information of a screen of the virtual space 11 after the position is moved to the teacher terminal 3-1.

In Step S13, the communication control unit 181 of the teacher terminal 3-1 receives the information transmitted from the virtual space management server 103 and then outputs the information to the output control unit 182.

In Step S14, the output control unit 182 causes the screen of the inside of the virtual space 11 after the teacher avatar T is moved to be displayed on the display unit 167 based on the information transmitted from the virtual space management server 103. Then, every time the user performs the operation of moving the teacher avatar T, the above process is repeated between the teacher terminal 3-1 and the virtual space management server 103

Next, a process of establishing the communication for a lesson will be described with reference to the flowchart of FIG. 18.

Figure 18:
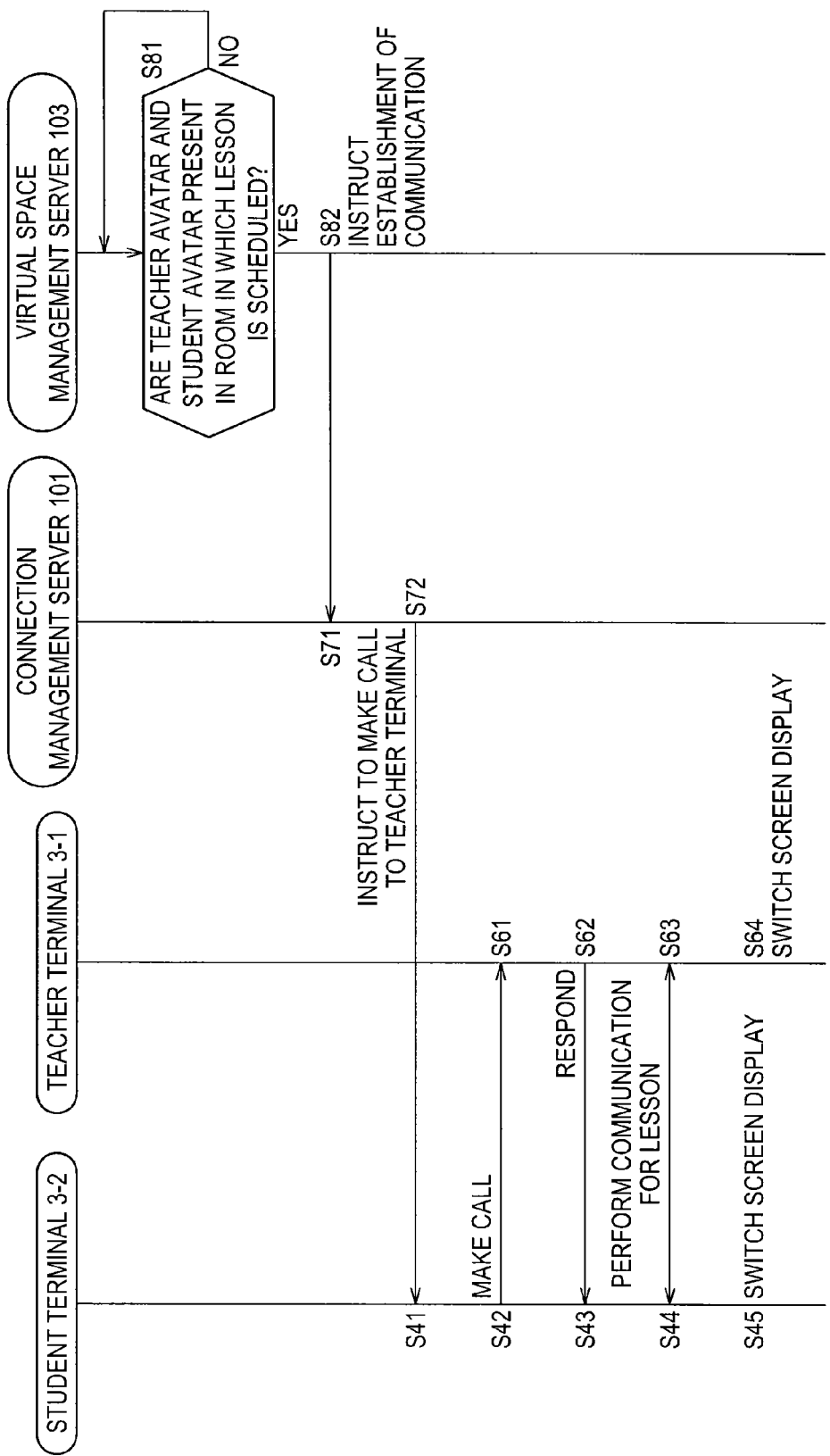
FIG. 18 is a flowchart for describing a process of establishing communication for a lesson.

The process of FIG. 18 is started when, for example, a lesson to be offered is registered in schedules of the user of the teacher terminal 3-1 and the user of the student terminal 3-2 managed by the user information management unit 152 of the virtual space management server 103 and the start time of the lesson arrives. It is assumed that the venue for the lesson is set to be the room 61 (FIG. 5) of the teacher avatar T operated by the user of the teacher terminal 3-1 and participants are set to be the user of the teacher terminal 3-1 and the user of the student terminal 3-2.

In Step S81, the control unit 153 of the virtual space management server 103 determines whether or not the teacher avatar T and the student avatar S are present in the room 61 in which the lesson is scheduled. The determination referred to herein is based on the position information of the teacher avatar T and the position information of the student avatar S managed by the position management unit 151. The control unit 153 stands by until the presence of the teacher avatar T and the student avatar S in the room 61 is determined.

When the presence of the teacher avatar T and the student avatar S in the room 61 is determined in Step S81, the control unit 153 transmits information of instructing establishment of the communication for a lesson between the teacher terminal 3-1 and the student terminal 3-2 to the connection management server 101 in Step S82. If the student avatar S is in the room 61 first, when the teacher avatar T enters the room 61 later, for example, an instruction of establishing the communication for a lesson is given to the connection management server 101. Information transmitted from the virtual space management server 103 to the connection management server 101 includes information for identifying, for example, the student terminal 3-2 that serves as a call source and call information of the teacher terminal 3-1 included in the user information of the user of the teacher terminal 3-1.

The connection management server 101 receives the information transmitted from the virtual space management server 103 in Step S71, and transmits information instructing to make a call to the teacher terminal 3-1 as a call destination to the student terminal 3-2 in Step S72. The information transmitted to the student terminal 3-2 includes the call information of the teacher terminal 3-1 transmitted from the virtual space management server 103.

The communication control unit 181 of the student terminal 3-2 receives the information transmitted from the connection management server 101 in Step S41, and makes a call to the teacher terminal 3-1 based on the call information in Step S42.

The communication control unit 181 of the teacher terminal 3-1 receives the call made from the student terminal 3-2 in Step S61, and responses thereto in Step S62.

In Step S43, the communication control unit 181 of the student terminal 3-2 receives the response from the teacher terminal 3-1.

In Step S44, the communication control unit 181 of the student terminal 3-2 transmits images photographed by the camera 170 and the voice of the user collected by the microphone 168 to the teacher terminal 3-1 and also receives information transmitted from the teacher terminal 3-1.

In Step S45, the output control unit 182 of the student terminal 3-2 controls the display unit 167 such that the screen of the virtual space 11 in the state in which the student avatar S and the teacher avatar T are present in the room 61 is switched to a screen at the time of the communication for a lesson.

On the other hand, in Step S63, the communication control unit 181 of the teacher terminal 3-1 transmits images photographed by the camera 170 and the voice of the user collected by the microphone 168 to the student terminal 3-2 and also receives information transmitted from the student terminal 3-2.

In Step S64, the output control unit 182 of the teacher terminal 3-1 controls the display unit 167 in the same manner such that the screen of the virtual space 11 in the state in which the student avatar S and the teacher avatar T are present in the room 61 is switched to the screen at the time of the communication for a lesson.

Figure 19:
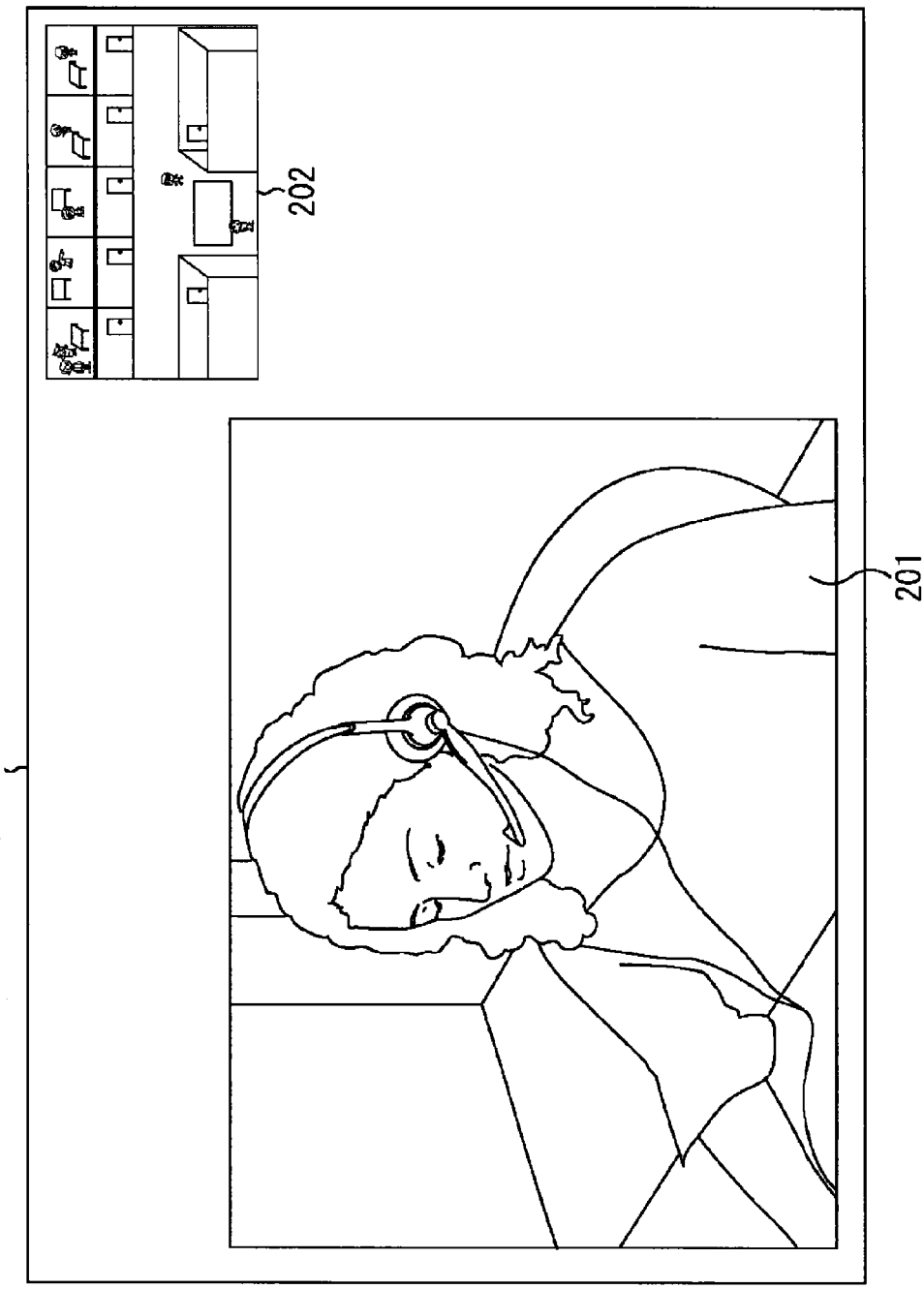
FIG. 19 is a diagram illustrating an example of a screen at the time of the communication for a lesson.

FIG. 19 is a diagram illustrating an example of the screen at the time of the communication for a lesson displayed in the student terminal 3-2.

Images photographed by and transmitted from the teacher terminal 3-1 that is the counterpart of the communication for a lesson is displayed on a real-time image display unit 201. The person displayed on the real-time image display unit 201 of FIG. 19 is the user of the teacher terminal 3-1 as the teacher of the lesson. The voice of the teacher collected by the teacher terminal 3-1 is output from the speaker 169.

A reduced image showing the inside of the house 25 of the teacher including the room 61 is displayed on a virtual space display unit 202. The user of the student terminal 3-2 can move the student avatar S through an operation of the mouse or the like even in the middle of the lesson.

Through the above process, the users can start the communication for a lesson with a simple operation of moving their avatars to the room in which a lesson is scheduled to be offered. In other words, when the start time of the lesson arrives, it is not necessary for the users to verify the IP address of the terminal used by the teacher, to make a call, and the like by themselves.

Generally in the physical world, a student comes in a classroom to take a lesson and waits for an entry of a teacher before a start of the lesson, so in the virtual space 11, a lesson can be started in the same sequence as above. Therefore, the user of the student terminal 3-2 can strongly feel as if he or she is actually receiving the lesson directly from the teacher, and thus a higher educational effect can be expected.

In addition, when the venue for the lesson is the residence (the house 27 of the student) allocated to the user of the student terminal 3-2, the user of the student terminal 3-2 may only await the entry of the teacher avatar T to start the lesson without moving the student avatar S.

Furthermore, when the teacher avatar T is not in the room 61, the communication for a lesson is not started and the inner state of the room 61 is merely displayed, so the user of the student terminal 3-2 can visually perceive the situation of the absence of the teacher avatar T in the room 61. It should be noted that, when the teacher avatar T has not arrived at the room 61 yet, it may be possible to set the whereabouts of the teacher avatar T in the virtual space 11 to be identified and then to make contact with the user of the teacher terminal 3-1. Accordingly, it is possible to avoid poor usability such as having no choice but to wait for a response from the counterpart as in communication on telephones.

Figure 20:
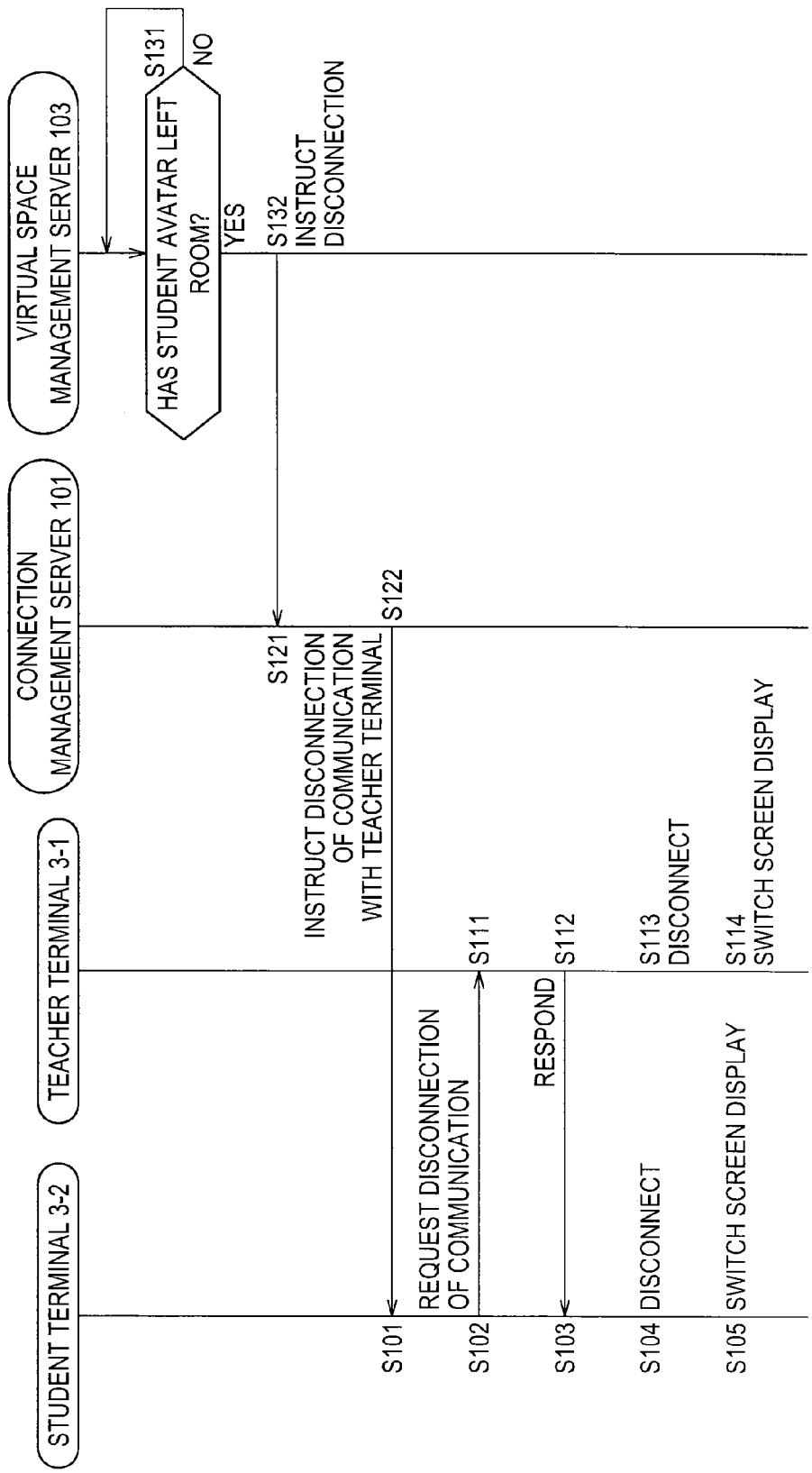
FIG. 20 is a flowchart for describing a process of disconnecting the communication for a lesson.

Next, a process of disconnecting the communication for a lesson will be described with reference to the flowchart of FIG. 20. The process of FIG. 20 is started while the communication for a lesson is established and the lesson is offered.

In Step S131, the control unit 153 of the virtual space management server 103 determines whether or not the student avatar S has left the room 61. The determination herein is made based on the position information of the student avatar S managed by the position management unit 151. The control unit 153 stands by until the student avatar S is determined to have left the room 61.

When the student avatar S is determined to have left the room 61 in Step S131, the control unit 153 transmits information instructing disconnection of the communication for a lesson between the teacher terminal 3-1 and the student terminal 3-2 to the connection management server 101 in Step S132. For example, when the student avatar S moves and leaves the room 61 using display of the virtual space display unit 202 of FIG. 19, disconnection of the communication for a lesson is instructed to the connection management server 101.

The connection management server 101 receives the information from the virtual space management server 103 in Step S121, and then transmits the information instructing disconnection of the communication for a lesson performed between the teacher terminal 3-1 to the student terminal 3-2 in Step S122.

The communication control unit 181 of the student terminal 3-2 receives the instruction from the connection management server 101 in Step S101, and then transmits information indicating a request for disconnecting the communication for a lesson to the teacher terminal 3-1 in Step S102.

The communication control unit 181 of the teacher terminal 3-1 receives the information from the student terminal 3-2 in Step S111, and then responds thereto in Step S112.

The communication control unit 181 of the student terminal 3-2 receives the response from the teacher terminal 3-1 in Step S103, and then disconnects the communication for a lesson in Step S104.

The output control unit 182 of the student terminal 3-2 erases display of the screen at the time of the communication for a lesson, and then causes a screen of the virtual space 11 in the state in which the student avatar S has left the room 61 to be displayed in Step S105.

On the other hand, the communication control unit 181 of the teacher terminal 3-1 disconnects the communication for a lesson in Step S113.

The output control unit 182 of the teacher terminal 3-1 erases display of the screen at the time of the communication for a lesson, and then causes a screen of the virtual space 11 in the state in which the student avatar S has left the room 61 to be displayed in Step S114.

Figure 21:
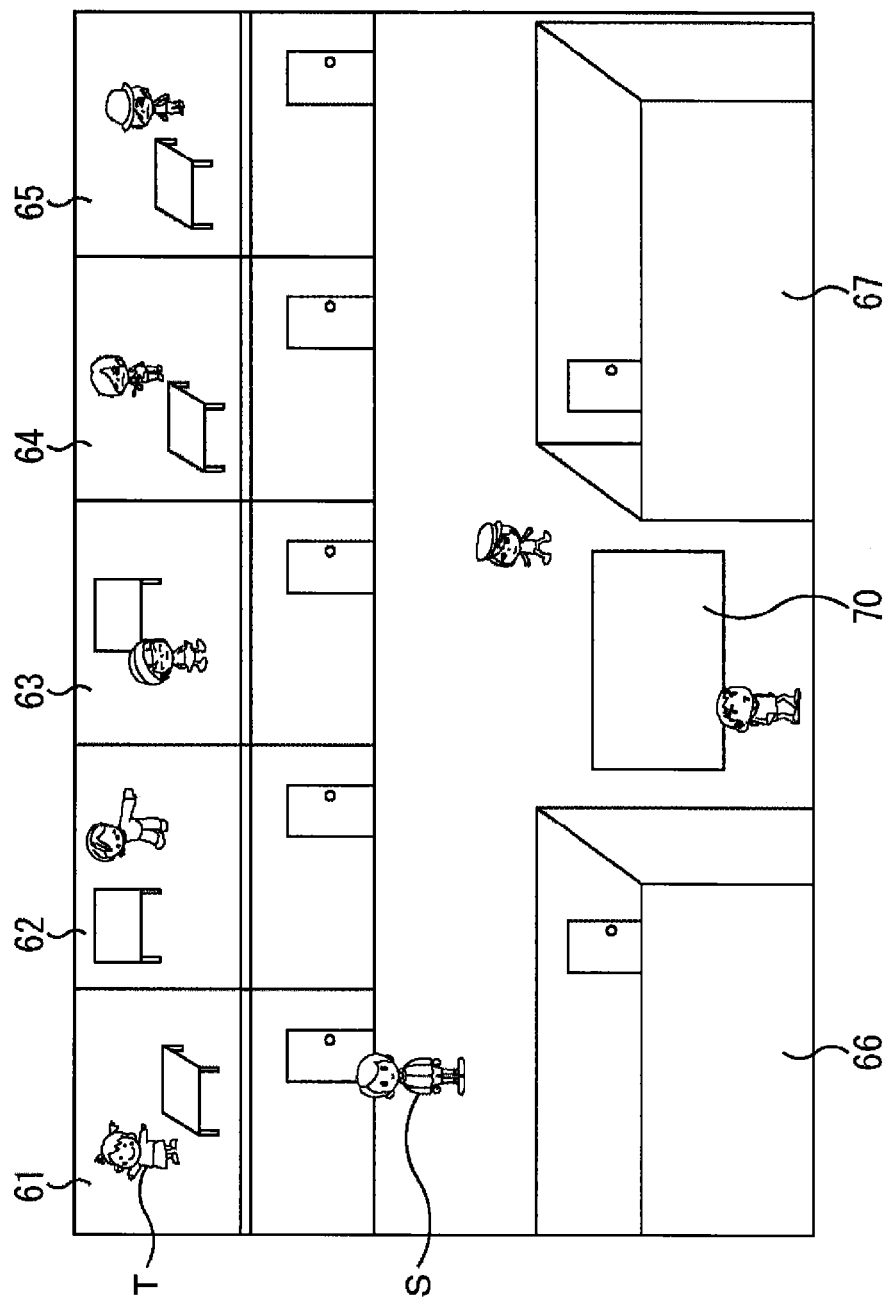
FIG. 21 is a diagram illustrating an example of a display screen.

FIG. 21 is a diagram illustrating an example of a screen displayed on the student terminal 3-2 immediately after the communication for a lesson is disconnected.

When the communication for a lesson is disconnected as described above, the screen of the virtual space 11 (the house 25 of the teacher) in the state in which the student avatar S has left the room 61 is displayed as illustrated in FIG. 21. Then, the user of the student terminal 3-2 performs an operation of moving the student avatar S to the house 27 of the student that is its residence or the like.

Through the above process, the user of the student terminal 3-2 can disconnect the communication for a lesson by withdrawing the student avatar S from the room 61. In other words, it is not necessary for the user to perform an operation of disconnecting the communication for a lesson by himself or herself.

[Modified Example of a Communication Establishment Process]

Next, another process of establishing the communication for a lesson will be described with reference to the flowchart of FIG. 22.

Figure 22:
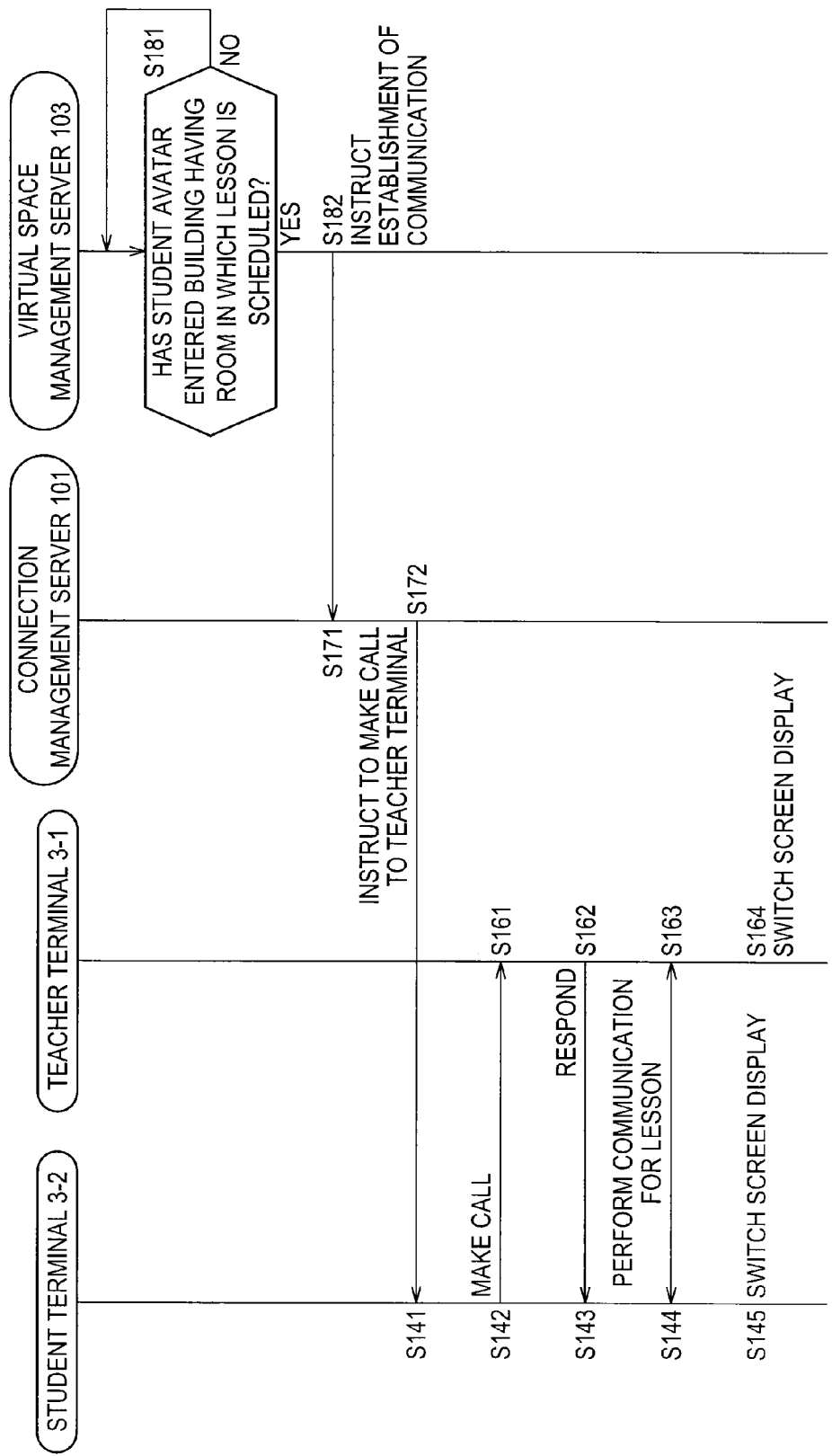
FIG. 22 is a flowchart for describing another process of establishing communication for a lesson.

In the process of FIG. 22, the communication for a lesson is set to be established when the teacher avatar T is in the room 61 and the student avatar S enters the house 25 of the teacher in which the room 61 is provided.

The process of FIG. 22 is also started when, for example, the lesson to be offered is registered in the schedules of the user of the teacher terminal 3-1 and the user of the student terminal 3-2 managed by the user information management unit 152 of the virtual space management server 103 and the start time of the lesson arrives. It is assumed that the venue for the lesson is set to be the room 61 and participants are set to be the user of the teacher terminal 3-1 and the user of the student terminal 3-2. In addition, the teacher avatar T is assumed to already be in the room 61.

In Step S181, the control unit 153 of the virtual space management server 103 determines whether or not the student avatar S has entered the house 25 of the teacher that is the building provided with the room 61 in which the lesson is scheduled. The determination herein is made based on, for example, whether or not the upper space ID included in the position information of the student avatar S matches the ID 104 that is the space ID of the house 25 of the teacher. The control unit 153 stands by until the student avatar S is determined to have entered the house 25 of the teacher.

When the student avatar S is determined to have entered the house 25 of the teacher in Step S181, the control unit 153 transmits information instructing the establishment of the communication for a lesson between the teacher terminal 3-1 and the student terminal 3-2 to the connection management server 101 in Step S182. The processes of Step S182 and thereafter are the same as those of Step S82 and thereafter of FIG. 18.

In other words, the connection management server 101 receives the information transmitted from the virtual space management server 103 in Step S171, and transmits information instructing to make a call to the teacher terminal 3-1 as a call destination to the student terminal 3-2 in Step S172.

The communication control unit 181 of the student terminal 3-2 receives the information transmitted from the connection management server 101 in Step S151, and then makes a call to the teacher terminal 3-1 based on the call information in Step S152.

The communication control unit 181 of the teacher terminal 3-1 receives the call from the student terminal 3-2 in Step S161, and then responds thereto in Step S162.

The communication control unit 181 of the student terminal 3-2 receives the response from the teacher terminal 3-1 in Step S153.

In Step S154, the communication control unit 181 of the student terminal 3-2 receives images photographed by the camera 170 and the voice of the user collected by the microphone 168 to the teacher terminal 3-1 and receives information transmitted from the teacher terminal 3-1.

In Step S155, the output control unit 182 of the student terminal 3-2 switches the screen of the virtual space 11 in the state in which the student avatar S is in the house 25 of the teacher to the screen at the time of the communication for a lesson.

On the other hand, in Step S163, the communication control unit 181 of the teacher terminal 3-1 receives images photographed by the camera 170 and the voice of the user collected by the microphone 168 to the student terminal 3-2 and receives information transmitted from the student terminal 3-2.

In Step S164, the output control unit 182 of the teacher terminal 3-1 switches the screen of the virtual space 11 in the state in which the teacher avatar T is in the room 61 to the screen at the time of the communication for a lesson.

Through the above process, when the teacher avatar T who is another participant in the lesson is in the room 61, the user of the student terminal 3-2 can establish the communication for a lesson by moving the student avatar S to the house 25 of the teacher, rather than to the room 61.

Next, still another process of establishing the communication for lesson will be described with reference to the flowchart of FIG. 23.

Figure 23:
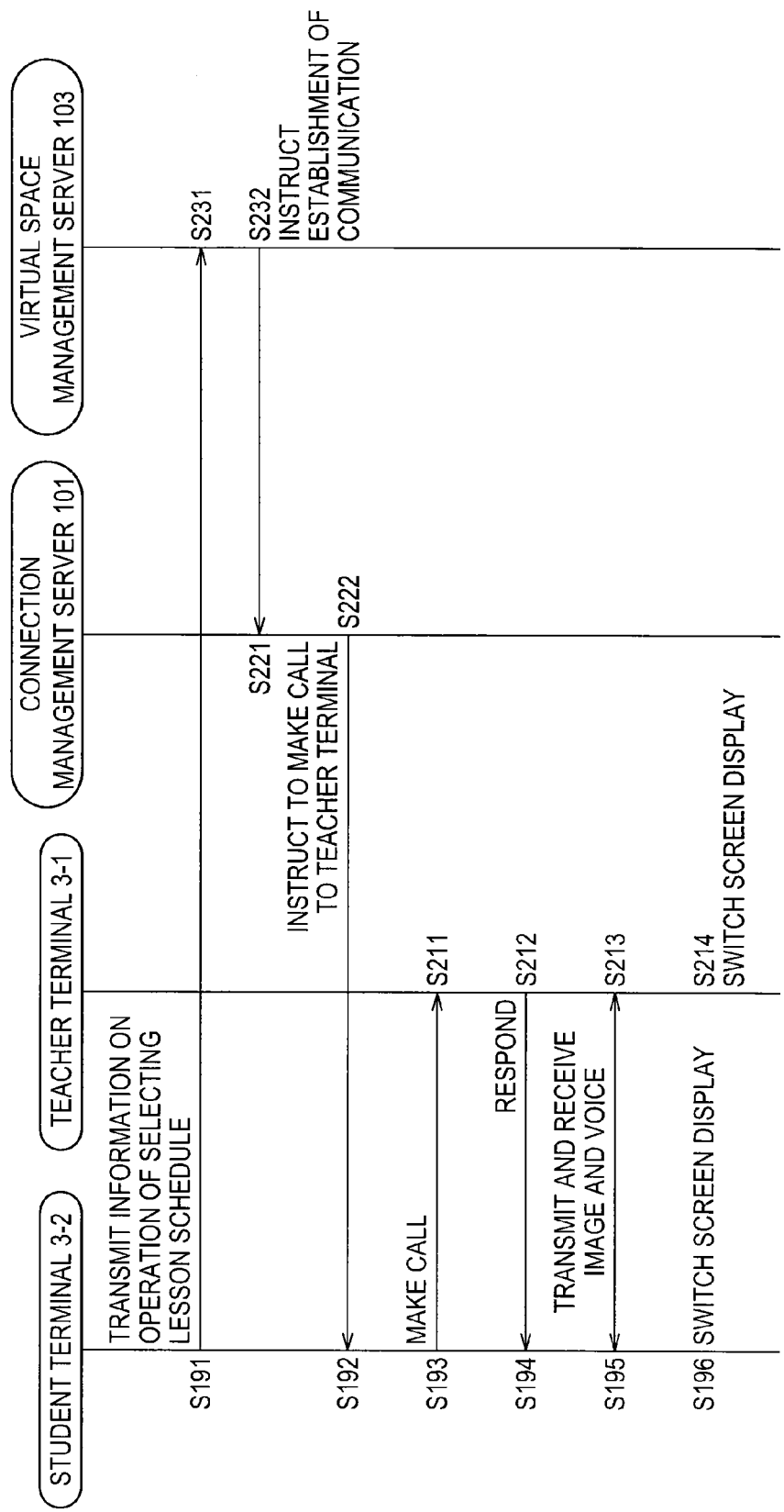
FIG. 23 is a flowchart for describing still another process of establishing communication for a lesson.

The process of FIG. 23 is started when, for example, the lesson to be offered is registered in the schedules included in the user information of the user of the teacher terminal 3-1 and the user of the student terminal 3-2 managed by the user information management unit 152 of the virtual space management server 103. It is assumed that the venue for the lesson is set to be the room 61 and participants are set to be the user of the teacher terminal 3-1 and the user of the student terminal 3-2. In addition, the teacher avatar T is assumed to already be in the room 61.

In the process of FIG. 23, the communication for a lesson is set to be established when the teacher avatar T is in the room 61 and the user of the student terminal 3-2 designates a schedule of the lesson. For example, when the student avatar S performs a predetermined operation while in its residence, information on schedules set by the user of the student terminal 3-2 is read from the database 108 and transmitted to the student terminal 3-2 by the virtual space management server 103. The output control unit 182 of the student terminal 3-2 causes the list of schedules to be displayed on the display unit 167 based on the information transmitted from the virtual space management server 103.

Figure 24:
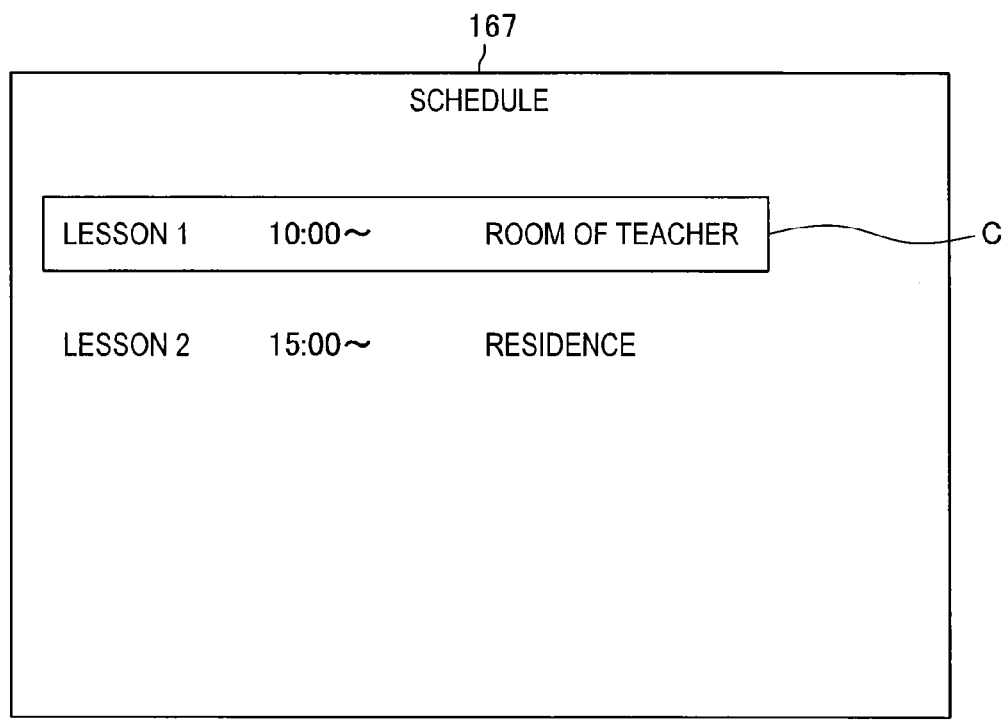
FIG. 24 is a diagram showing an example of a list of schedules.

FIG. 24 is a diagram showing an example of the list of schedules. In the example of FIG. 24, two schedule items of a lesson 1 and a lesson 2 are registered, and the lesson 1 is selected with a cursor C. The start time of the lesson 1 is set to be 10:00 and the venue is set to be the room of the teacher. In addition, the start time of the lesson 2 is set to be 15:00 and the venue is set to be the residence (the house 27 of the student).

When the lesson 1 is selected from the screen of the list of schedules of FIG. 24, the communication control unit 181 of the student terminal 3-2 transmits information indicating that the schedule item of the lesson 1 has been selected to the virtual space management server 103 in Step S191 of FIG. 23.

In Step S231, the control unit 153 of the virtual space management server 103 receives the information transmitted from the student terminal 3-2.

In Step S232, the control unit 153 transmits information instructing establishment of the communication for a lesson between the teacher terminal 3-1 and the student terminal 3-2 to the connection management server 101. The processes of Step S232 and thereafter are the same as those of Step S82 and thereafter of FIG. 18.

In other words, the connection management server 101 receives the information transmitted from the virtual space management server 103 in Step S221 and then transmits information instructing to make a call to the teacher terminal 3-1 as a call destination to the student terminal 3-2 in Step S222.

The communication control unit 181 of the student terminal 3-2 receives the information transmitted from the connection management server 101 in Step S192, and then makes a call to the teacher terminal 3-1 based on the call information in Step S193.

The communication control unit 181 of the teacher terminal 3-1 receives the call from the student terminal 3-2 in Step S211 and then responds thereto in Step S212.

In Step S194, the communication control unit 181 of the student terminal 3-2 receives the response from the teacher terminal 3-1.

In Step S195, the communication control unit 181 of the student terminal 3-2 transmits images photographed by the camera 170 and the voice of the user collected by the microphone 168 to the teacher terminal 3-1 and receives information transmitted from the teacher terminal 3-1.

In Step S196, the output control unit 182 of the student terminal 3-2 controls the display unit 167 such that the screen of the virtual space 11 in the state in which the student avatar S is in the residence is switched to the screen at the time of the communication for a lesson.

On the other hand, in Step S213, the communication control unit 181 of the teacher terminal 3-1 transmits images photographed by the camera 170 and the voice of the user collected by the microphone 168 to the student terminal 3-2 and receives information transmitted from the student terminal 3-2.

In Step S214, the output control unit 182 of the teacher terminal 3-1 likewise switches the screen of the virtual space 11 in the state in which the teacher avatar T is in the room 61 to the screen at the time of the communication for a lesson.

Through the above process, the user of the student terminal 3-2 can easily establish the communication for a lesson by merely selecting the schedule item of the lesson without moving the student avatar S to the room 61 when the teacher avatar T is in the room 61.

Figure 25:
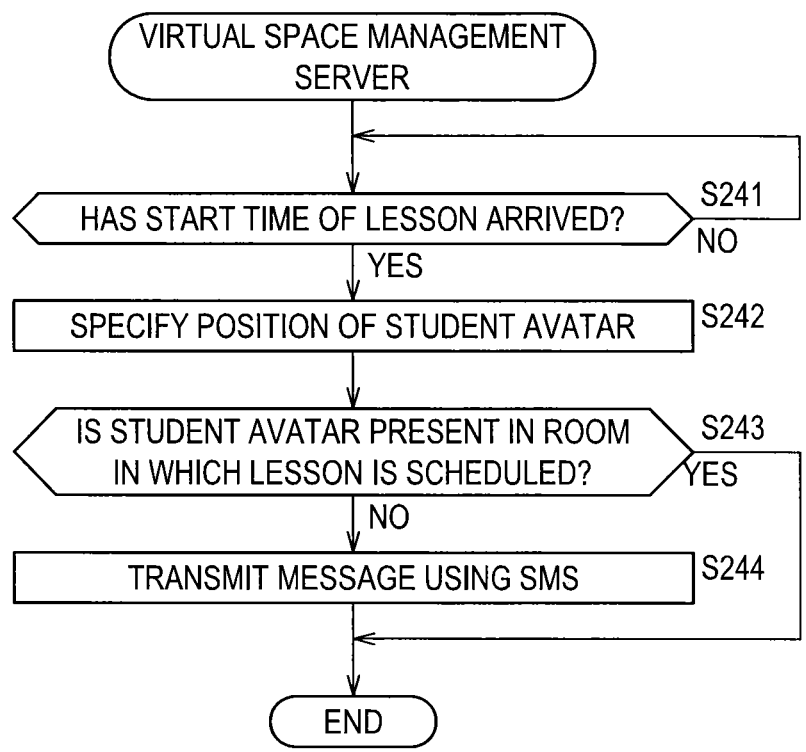
FIG. 25 is a flowchart for describing a process of managing the virtual space management server that transmits messages.

Next, a process of the virtual space management server 103 that notifies the student that the start time of the lesson has arrived using a message of SMS will be described with reference to the flowchart of FIG. 25.

In Step S241, the control unit 153 of the virtual space management server 103 determines whether or not the start time of the lesson has arrived based on the schedule of the user of the student terminal 3-2 managed by the user information management unit 152 and stands by until the start time is determined to have arrived.

When the start time of the lesson is determined to have arrived in Step S241, the control unit 153 specifies the position of the student avatar S based on the position information in Step S242.

In Step S243, the control unit 153 determines whether or not the student avatar S is present in the room 61 in which the lesson is scheduled.

When the student avatar S is determined not to be present in the room 61 in Step S243, the message transmission control unit 154 transmits a message of SMS based on message transmission destination information transmitted from the control unit 153 in Step S244. When the student avatar S is determined not to be present in the room 61, the message transmission destination information (FIG. 14) included in the user information of the user of the student terminal 3-2 is output to the message transmission control unit 154 from the control unit 153. The content of the message prompts the user to move the student avatar S into the room 61 because the start time of the lesson has arrived.

When the mobile telephone is designated as the transmission destination of the message, the user of the student terminal 3-2 reads the message transmitted from the virtual space management server 103 and operates the student terminal 3-2 to activate software for using the virtual space service. In addition, the user of the student terminal 3-2 can receive the lesson after the activation of the software by moving the student avatar S into the room 61.

Modified Example

Hereinabove, the case of taking an on-line lesson has been described, however, the same process is also applied to holding a conference. When avatars of participants gather in a room in which a conference is scheduled, for example, communication is automatically established and a video conference using images and voices is started, without performing an operation of making a call to other participants or the like.

In addition, although images and voices are set to be transmitted and received through communication established between the plurality of terminals 3 hereinabove, communication in which only images or only voices are transmitted and received may be intended.

The series of processes described above can be executed using hardware, or can be executed using software. When the series of processes is executed using software, a program configuring the software is installed in a computer that is incorporated into dedicated hardware, a general-purpose personal computer, or the like.

The installed program is provided by being recorded in the removable medium 141 illustrated in FIG. 12 such as an optical disc including a DVD (Digital Versatile Disc) or the like, or a semiconductor memory. In addition, the program may be provided via a wired or wireless transmission medium such as a local area network, the Internet, or digital broadcasting. The program can be installed in the ROM 132 or the storage unit 138 in advance.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

[Combination Example of Configuration]

Additionally, the present technology may also be configured as below.

(1)

An information processing system including:

a position management unit configured to manage positions of avatars operated by users in a virtual space;

a schedule management unit configured to manage a schedule of communication of the users; and a control unit configured to cause communication between terminals used by the users who are scheduled to have the communication to be established when the avatars of the users who are scheduled to have the communication gather in a predefined place in the virtual space and to cause at least one of an image and a voice to be transmitted and received.

(2)

The information processing system according to (1), wherein the users who are scheduled to have the communication are a teacher who provides a lesson using images and voices and a student who receives the lesson.

(3)

The information processing system according to (1), wherein the users who are scheduled to have the communication are participants in a conference using images and voices.

(4)

The information processing system according to any one of (1) to (3), wherein, in a case where the predefined place is a place allocated as a residence of the avatar of the predetermined user who is scheduled to have the communication, the control unit causes the communication between the terminals to be established when the avatar of the other user who is scheduled to have the communication moves in the residence.

(5)

The information processing system according to any one of (1) to (4), wherein, when the avatars of the users who are in the communication are moved out of the predefined place after the communication between the terminals is established, the control unit causes the communication between the terminals to be disconnected.

(6)

The information processing system according to any one of (1) to (5), wherein, in a case where the predefined place is a room inside a building and the avatar of the predetermined user who is scheduled to have the communication is in the room, the control unit causes the communication between the terminals to be established when the avatar of the other user who is scheduled to have the communication enters the building.

(7) The information processing system according to any one of (1) to (5), wherein, in a case where the avatar of the predetermined user who is scheduled to have the communication is in the predefined place, the control unit causes the communication between the terminals to be established when the other user who is scheduled to have the communication designates a schedule of the communication on a schedule of the other user.

(8) The information processing system according to any one of (1) to (7), further including:
a transmission control unit configured to transmit a message to the users who have not moved the avatars to the predefined place when a scheduled start time of the communication arrives.

(9) The information processing system according to (8), wherein the transmission control unit transmits a message of SMS to mobile terminals used by the users who have not moved the avatar to the predefined place.

REFERENCE SIGNS LIST 1 virtual space providing system
101 connection management server
102 document-sharing and white-board function management server
103 virtual space management server
104 user management server
105 content management server
106 proxy server
107 deposit and charge management server
108 database

The invention claimed is:

1. An information processing system comprising:
a position management unit configured to manage positions of avatars operated by users in a virtual space;
a schedule management unit configured to manage a schedule of communication of the users; and
a control unit configured to:
display a list of schedules of one of the users on a terminal used by another of the users,
cause communication between terminals used by the users who are scheduled to have the communication to be established:
in an event the avatars of the users who are scheduled to have the communication are moved to positions inside a predefined place in the virtual space, and
in an event the avatar of the other user who is scheduled to have the communication is outside the predefined place and the avatar of the one of the users who is scheduled to have the communication is inside the predefined place, and the other user selects a schedule item in the displayed list of schedules, and
cause at least one of an image or a voice to be transmitted and received by the terminals.

2. The information processing system according to claim 1, wherein the users who are scheduled to have the communication are a teacher who provides a lesson using the at least one of the image or the voice and a student who receives the lesson.

3. The information processing system according to claim 1, wherein the users who are scheduled to have the communication are participants in a conference using images and voices.

4. The information processing system according to claim 1, wherein, in a case where the predefined place is a place allocated as a residence of the avatar of one of the users who is scheduled to have the communication, the control unit is configured to cause the communication between the terminals to be established in an event the avatar of the other user who is scheduled to have the communication moves in the residence.

5. The information processing system according to claim 1, wherein, in an event the avatars of the users who are in the communication are moved out of the predefined place after the communication between the terminals is established, the control unit is configured to cause the communication between the terminals to be disconnected.

6. The information processing system according to claim 1, wherein, in a case where the predefined place is a room inside a building and the avatar of one of the users who is scheduled to have the communication is in the room, the control unit is configured to cause the communication between the terminals to be established in an event the avatar of the other user who is scheduled to have the communication enters the building.

7. The information processing system according to claim 1, wherein, in a case where the avatar of one of the users who is scheduled to have the communication is in the predefined place, the control unit is configured to cause the communication between the terminals to be established in an event the other user who is scheduled to have the communication designates a schedule of the communication on a schedule of the other user.

8. The information processing system according to claim 1, further comprising:
a transmission control unit configured to transmit a message to the users who have not moved the avatars to the predefined place in an event a scheduled start time of the communication arrives.

9. The information processing system according to claim 8, wherein the transmission control unit is configured to transmit a message of SMS to mobile terminals used by the users who have not moved the avatar to the predefined place.

10. An information processing method comprising:
managing positions of avatars operated by users in a virtual space;
managing a schedule of communication of the users;
displaying a list of schedules of one of the users on a terminal used by another of the users;
causing communication between terminals used by the users who are scheduled to have the communication to be established:
in an event the avatars of the users who are scheduled to have the communication are moved to positions inside a predefined place in the virtual space, and
in an event the avatar of the other user who is scheduled to have the communication is outside the predefined place and the avatar of the one of the users who is scheduled to have the communication is inside the predefined place, and the other user selects a schedule item in the displayed list of schedules; and
causing at least one of an image or a voice to be transmitted and received by the terminals.

11. A non-transitory computer-readable storage medium, having stored thereon, a set of computer-executable instructions for causing a computer to perform the steps of:

managing positions of avatars operated by users in a virtual space;

managing a schedule of communication of the users;

displaying a list of schedules of one of the users on a terminal used by another of the users;

causing communication between terminals used by the users who are scheduled to have the communication to be established:
- in an event the avatars of the users who are scheduled to have the communication are moved to positions inside a predefined place in the virtual space, and
- in an event the avatar of the other user who is scheduled to have the communication is outside the predefined place and the avatar of the one of the users who is scheduled to have the communication is inside the predefined place, and the other user selects a schedule item in the displayed list of schedules; and causing at least one of an image or a voice to be transmitted and received by the terminals.

12. The information processing system according to claim 1, wherein the control unit is configured to establish a virtual chat between the one of the users and the other user in an event the avatar of the one of the users is moved to a position in which the avatar of the other user is placed in the virtual space and a predetermined operation is performed.

13. The information processing system according to claim 1, wherein the position management unit is configured to manage one or more spaces in the virtual space in the form of a hierarchical structure.

14. The information processing system according to claim 1, wherein the position management unit is configured to allocate space identifiers to one or more spaces in the virtual space, and manage the positions of the avatars of the users using space identifiers.

* * * * *